United States Patent
Diaz et al.

(10) Patent No.: US 12,455,557 B2
(45) Date of Patent: Oct. 28, 2025

(54) APPARATUSES AND METHODS FOR NON-DISRUPTIVE REPLACEMENT OF SIMPLEX I/O COMPONENTS

(71) Applicant: FISHER-ROSEMOUNT SYSTEMS, INC., Round Rock, TX (US)

(72) Inventors: Sergio Diaz, Pflugerville, TX (US);
Gary K. Law, Georgetown, TX (US);
Trevor Duncan Schleiss, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 740 days.

(21) Appl. No.: 17/837,264

(22) Filed: Jun. 10, 2022

(65) Prior Publication Data

US 2023/0400838 A1    Dec. 14, 2023

(51) Int. Cl.
G05B 19/418     (2006.01)

(52) U.S. Cl.
CPC ... *G05B 19/41865* (2013.01); *G05B 19/4183* (2013.01); *G05B 19/4188* (2013.01)

(58) Field of Classification Search
None
See application file for complete search history.

(56) References Cited

U.S. PATENT DOCUMENTS

| | | | |
|---|---|---|---|
| 7,072,995 B1 * | 7/2006 | Burroughs | G06F 13/4072 710/16 |
| 9,495,313 B2 | 11/2016 | Burr et al. | |
| 2003/0188221 A1 * | 10/2003 | Rasmussen | G06F 11/183 714/11 |
| 2005/0193273 A1 * | 9/2005 | Burkey | G06F 11/1662 714/E11.085 |
| 2015/0127876 A1 | 5/2015 | Erni et al. | |
| 2015/0323977 A1 * | 11/2015 | Pachoud | H02J 9/06 307/64 |

(Continued)

OTHER PUBLICATIONS

Search Report for Application No. GB2308690.3, dated Feb. 16, 2024.

*Primary Examiner* — Ariel Mercado-Vargas
(74) *Attorney, Agent, or Firm* — MARSHALL, GERSTEIN & BORUN LLP

(57) ABSTRACT

Techniques for physically removing and replacing a simplex I/O component include plant personnel placing the component into a "REPLACEABLE" state via a user interface of the component. In response, the simplex I/O component informs the I/O subsystem thereof. The I/O subsystem stores a record of the component's REPLACEABLE state and begins to hold data values (e.g., field device values) most recently received from the component. When the I/O subsystem detects that the simplex I/O component is uncommunicative (e.g., due to being removed and replaced), based on the stored record of the "REPLACEABLE" state, the I/O subsystem retrieves the most recently received held data value and transmits it to a controller, thereby maintaining controlled (e.g., non-disruptive) execution of a control loop. When the replacement simplex I/O component initializes to an "IN-SERVICE" state, the I/O subsystem updates its state record accordingly, and resumes forwarding live field data values to the controller.

22 Claims, 8 Drawing Sheets

(56) References Cited

U.S. PATENT DOCUMENTS

| | | | |
|---|---|---|---|
| 2015/0347342 A1* | 12/2015 | Alley | G06F 13/4068 |
| | | | 710/306 |
| 2018/0107609 A1* | 4/2018 | Kumar Kn | G06F 8/61 |
| 2018/0314240 A1* | 11/2018 | Velagapalli | G05B 19/41835 |
| 2021/0081346 A1 | 3/2021 | Nixon et al. | |
| 2021/0098904 A1* | 4/2021 | Wrobel | G05B 19/054 |
| 2021/0100125 A1* | 4/2021 | Killian | G05B 19/4186 |
| 2022/0075352 A1 | 3/2022 | Nixon et al. | |

* cited by examiner

APPARATUSES AND METHODS FOR NON-DISRUPTIVE REPLACEMENT OF SIMPLEX I/O COMPONENTS

TECHNICAL FIELD

The present disclosure relates generally to process plants and process control systems, and more particularly, to replacing simplex I/O components of process plants and process control systems to be without disruption to an executing industrial process.

BACKGROUND

Distributed industrial process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more industrial processes executing within the process plant or system. Smart field devices, such as the field devices conforming to the well-known Fieldbus protocol may also perform control calculations, alarming functions, and other control functions commonly implemented within the controller. The process controllers, which may or may not be located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices (and/or to other field devices and/or controllers) to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices, controllers, and I/O devices are generally referred to as "process control devices," and are generally located, disposed, or installed in a field environment of a process control system or plant.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Automation Solutions, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. A control scheme may be implemented, for example, in a control loop that includes the controller and one or more field devices. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally, field devices can be communicatively coupled to I/O cards that translate the signals received from the field devices to signals that can be processed by the controllers, and translate the signals received from the controllers to signals that can be processed by the field devices. Each channel of each I/O card, corresponding to a particular field device, must be associated with the appropriate signal types (so that signals are processed appropriately by the I/O card) and the I/O card must be communicatively coupled to the controller or controllers that will eventually be receiving signals from and/or sending signals to the field devices coupled to that I/O card.

In some process control systems, electronic marshalling systems or devices are utilized to efficiently implement I/O connections between field devices and controllers. For example, within a particular area of a process plant, a termination block may serve as the termination point for the wiring (or connection) of field devices located in the particular physical area of the process plant. The termination block may be located in an electronic marshalling cabinet disposed in the termination area, where the marshalling cabinet includes a multiplicity of communication modules that marshal, organize, or route signals between communication modules coupled to the field devices and one or more I/O cards communicatively coupled to the controllers associated with the field devices. In addition to the termination block, communication modules, and I/O cards, the marshalling cabinet may also include power provisioning to supply power to the I/O cards and the communication modules, power dissipation mechanisms (e.g., heat sinks, fans, etc.) to keep components in the marshalling cabinet from overheating, all of the wiring coming in from the field devices, and various solutions for keeping that wiring from becoming too unwieldy.

An electronic marshalling system or device can include different types of electronic marshalling components or "EMCs" (such as I/O cards, I/O signal conditioners, and the like) each of which may have a different level of availability and tolerance to different types of failures. For example, a simplex I/O component (e.g., a simplex I/O card, a simplex I/O signal conditioner, a simplex I/O termination block, etc.) may have minimal to no tolerance to a single failure, or may include a set of redundant subcomponents which can withstand the failure of one of the redundant subcomponents with no loss of functionality. A pair or group of redundant EMC components (e.g., redundant I/O cards, redundant I/O signal conditioners, etc.) can typically provide higher availability for the I/O functionality that the pair or group provides as one of the pair can assume providing the I/O functionality (e.g., a "hot spare") when the other one of the pair or group fails.

A non-redundant or simplex I/O component (e.g., an I/O component for which the process control system does not have a corresponding hot spare) must be physically replaced by using various complex (and largely manual) procedures, such as by setting up a temporary bypass of the simplex I/O component and eventually restoring the process control system to utilize the replacement simplex I/O component. Plant personnel must properly coordinate such temporary bypasses with the execution of the process control system so that field device, controller, and/or other signals are handled correctly during the bypass procedure. Lack of coordination and/or mishandling of such signals while plant personnel replace a non-redundant or simplex I/O component can result in loss of messages and spurious trips of various components of the process control system, which can adversely and needlessly disrupt the execution of the industrial process and its performance.

SUMMARY

Techniques, systems, apparatuses, components, devices, and methods for replacing simplex I/O components of a process control system of an industrial process plant without disrupting an executing industrial process are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes (also referred to herein as "industrial processes") that operate to manufacture, refine, or transform, raw physical materials to generate or produce physical products.

Generally speaking, the techniques, systems, apparatuses, components, devices, and methods for physically replacing simplex I/O components of a process control system without disrupting an executing industrial process (e.g., replacing a simplex I/O component in a "non-disruptive" manner) allow plant personnel to indicate or signal, to at least portions of the process control system, that plant personnel are about to physically remove and replace a simplex I/O component. Upon receiving indication from plant personnel, the portion(s) of the process control system may enter into a temporary, safe mode of run-time operations with respect to the control loop that utilizes the simplex I/O component (and optionally with respect to an industrial process in which the control loop is included), so that the control loop can continue its run-time operations while the simplex I/O component is being physically removed and replaced. Subsequently, when the newly-replaced simplex I/O component indicates to the process control system that it is on-line, the process control system may exit the temporary, safe mode of operations and resume operating in an normal mode or manner. Advantageously, by using the novel techniques described herein, physical removal and replacement of simplex I/O components may be seamless with respect to the operations of the industrial process (e.g., is "non-disruptive" to the run-time operations of the industrial process), as bypasses do not need to be manually set up and removed, the executing process does not need to be halted or suspended for the bypasses to be set up and remove, and the timing of the manual setting up and removing bypasses does not need to be coordinated with the executing process, thereby reducing the risk of (and in some cases, eliminating) lost message, tripping, and other disruptions to the industrial process which are caused by currently utilized techniques.

DETAILED DESCRIPTION

As discussed above, an industrial process plant, process control system, or process control environment supports non-disruptive simplex I/O component replacement by utilizing one or more of the novel techniques, systems, apparatuses, components, devices, and/or methods described herein. The process plant, when commissioned and operating on-line, includes one or more wired or wireless field devices, components, or elements that perform physical functions in concert with a process control system to control one or more industrial processes executing within the process plant. The process plant and/or process control system may include, for example, one or more wired communication networks and/one or more wireless communication networks. Additionally, the process plant or control system may include centralized databases, such as continuous, batch, asset management, historian, and other types of databases.

Figure 1:
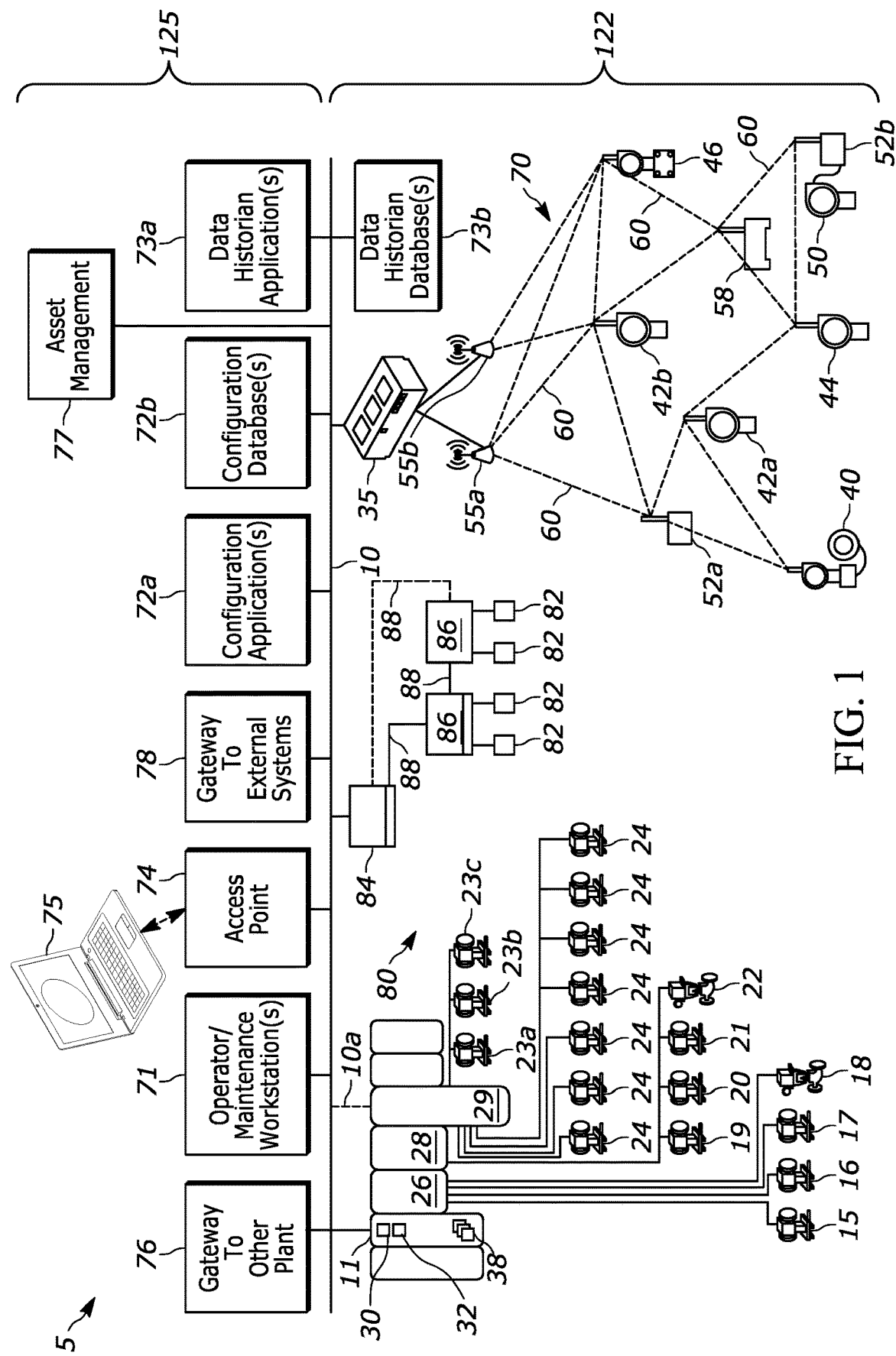
FIG. 1 depicts a block diagram illustrating an example system process plant, at least a portion of which implements embodiments of the techniques for non-disruptive, simplex I/O component replacement described herein.

FIG. 1 depicts a schematic diagram of an example process plant, process control system, or process control environment 5, in which simplex I/O components (such as I/O cards, electronic marshalling devices or components, I/O signal conditioners, and/or other I/O units) can be replaced in a manner that is generally, if not totally, non-disruptive to an executing control loop that utilizes the simplex I/O component. Generally speaking, the example process plant 5 of FIG. 1 includes one or more process controllers that receive signals indicative of process measurements made by field devices, that process this information to implement a control routine, and that generate control signals that are sent over wired or wireless process control communication links (physical layers) to other field devices to control the operation of a process in the plant 5. Typically, each of the field devices performs a physical function (e.g., opening or closing a valve, increasing or decreasing a temperature, taking a measurement, sensing a condition, etc.) to control the operation of a process. The field devices may communicate with process controllers using I/O devices, and the process controllers, field devices, and I/O devices may be wired or wireless. Moreover, any number and combination of wired and wireless process controllers, field devices and I/O devices may be included in the process plant environment 5.

As an example only, FIG. 1 illustrates a process controller 11 that is communicatively connected to wired field devices 15-22 via standard or traditional process control protocol input/output (I/O) cards 26 and 28, and to wired field devices 23 and 24 via an advanced or multi-protocol I/O card 29 which will be referred to herein as a mixed or multiple protocol I/O card or device or a mixed or multiple physical layer I/O device. In this case, the controller 11 is communicatively coupled to the I/O devices 26, 28 and 29 via a backplane bus (not shown) which may implement any desired communication protocol, including any proprietary protocol. The controller 11 is also communicatively connected to wireless field devices 40-46 in a wireless network 70 via a wireless gateway 35 and a process control data highway or backbone 10. The process control data highway 10, which may be implemented as an Ethernet communication structure, may include one or more wired and/or wireless communication links, and may be implemented using any desired or suitable general purpose IP communication protocol such as, for example, an Ethernet protocol. In some configurations (not shown), the controller 11 may be communicatively connected to the wireless gateway 35 using one or more communication networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc. Still further, the controller 11 may be coupled to other field devices 82 via a further field device network 80 that uses an advanced physical layer (APL) or other physical layer that supports more packet based or advanced (e.g., general purpose IP based) communication protocols.

The controller 11, which may be, by way of example, the DeltaV™ controller sold by Emerson Automation Solutions, may operate to implement a batch process or a continuous process using at least some of the field devices 15-24, 40-46 and 82. In addition to being communicatively connected to the process control data highway 10, the controller 11 is communicatively connected to at least some of the field devices 15-24, 40-46 and 82 via the I/O cards 26, 28 and 29 using any desired hardware and software associated with various different communication protocols, for example, a 4-20 mA, the FOUNDATION® Fieldbus protocol, the HART® protocol, the WirelessHART® protocol, etc. In FIG. 1, the controller 11, the field devices 15-24 and 82, and the I/O cards 26, 28 and 29 are wired devices, while the field devices 40-46 are wireless field devices. As will be understood, the wired field devices 15-24 and 82, and the wireless field devices 40-46 can conform to any standard or available communication protocols, such as any wired or wireless protocol, including any standards or protocols developed in the future.

Generally speaking, the process controller 11 of FIG. 1 includes a processor 30 that implements or oversees one or more process control routines 38 (e.g., that are stored in a memory 32). The processor 30 is configured to communicate with the field devices 15-24, 40-46, and 82 and with other nodes communicatively connected to the controller 11. The control routines 38 may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In one example, the controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may thus include one or more control routines 38 that may implement one or more control loops, which are performed by executing one or more of the function blocks.

The wired field devices 15-24, 82 may be any types of devices, such as sensors, valves, transmitters, positioners, etc., while the I/O cards 26 and 28 may be any known types of I/O devices conforming to any desired communication or controller protocol. In FIG. 1, the field devices 15-18 are illustrated as standard 4-20 mA devices or HART® devices that communicate over analog lines or combined analog and digital lines (the HART or 4-20 physical layer) to the I/O card 26, while the field devices 19-22 are smart devices, such as FOUNDATION® Fieldbus field devices, that communicate over a digital bus to the I/O card 28 using a FOUNDATION® Fieldbus communications protocol and physical layer. In some embodiments, though, at least some of the wired field devices 15, 16 and 18-22 and/or at least some of the I/O cards 26, 28 may alternatively communicate with the controller 11 using other suitable control system protocols (e.g., PROFIBUS®, DEVICENET®, FOUNDATION Fieldbus®, CONTROLNET™, MODBUS®, HART, etc.)

Moreover, as illustrated in general in FIG. 1, the wired field devices 23 and 24 are communicatively coupled to the I/O device 29 via various different communication lines or buses. In particular, and as will be described in more detail herein, the I/O device 29 includes multiple output ports, pin connectors, or termination blocks, which may each be adapted to accept physical layer hardware (communication lines) associated with different physical layers that support different field device communication protocols (e.g., two-wire, three-wire, four-wire, etc. physical layers). Still further, the I/O device 29 supports communications with different devices connected to the termination blocks thereof using different communication protocols. In one example, the I/O device 29 may support and be connected to HART compliant physical layers (which may be used to communicate with the HART compliant field devices 23 using the HART communication protocol) and may also support and be connected to one or more other field devices 24 via one or more advanced physical layers, such as an Ethernet bus or wire set, the APL physical layer, etc., and may use a packet based protocol (e.g., an IP protocol, an Ethernet protocol, etc.), for example, to communicate with the field devices 24 over the advanced physical layer hardware. Of course, the field devices 23 and 24 may also be any types of devices, including sensors, valves, transmitters, positioners, etc., and may communicate with the I/O device or I/O card 29 using analog and/or digital signals and using wired or wireless physical layers.

While the I/O device 29 is communicatively connected to the controller 11 via a backplane bus (not shown in FIG. 1), as indicated by the dotted line 10a in FIG. 1, and thus enables the controller 11 to communicate with the field devices connected to the I/O device 29, the I/O device 29 may instead or also be directly connected to the bus or Ethernet connection 10 and communicate directly with applications and other devices (and even devices outside or external to the plant 5) on the bus 10 to provide direct access to the field devices 23, 24 connected to the I/O card 29. As will be described in more detail herein, because some of the field devices 23, 24 connected to the I/O card 29 may include IP addresses and therefore may be addressable via an IP protocol (that is, these field devices may be part of an IIoT system or other monitoring system or otherwise may be reachable via an IP communication protocol), the I/O card 29 can also act as a direct gateway within an asset management system or an IIoT system to the field devices 23, 24, so that these systems do not need to communicate through a controller (such as the controller 11) to obtain information from field devices that support an IP communication protocol.

In the example plant 5 depicted in FIG. 1, the wireless field devices 40-46 communicate via the wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the same wireless protocol or another wireless protocol, for example). To communicate with one or more other nodes that are not configured to communicate wirelessly, the wireless field devices 40-46 may utilize the wireless gateway 35 connected to the process control data highway 10 or to another process control communications network. The wireless gateway 35 provides access to various wireless devices 40-58 of the wireless communication network 70. In particular, the wireless gateway 35 provides communicative coupling between the wireless devices 40-58, the wired devices 11-29, and/or other nodes or devices of the process control plant 5. For example, the wireless gateway 35 may provide communicative coupling by using the process control data highway 10 and/or by using one or more other communications networks of the process plant 5.

Similar to the wired field devices 15-24, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART®, and may also support one or more other communication protocols such as Foundation Fieldbus®, PROFIBUS®, DEVICENET®, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

Still further, the process plant 5 includes an advanced physical layer network 80 that connects the field devices 82 directly to the network bus or backbone 10 using a packet based or IP communication protocol, such as any protocol supported by an Ethernet connection. These protocols include, but are not limited to, internet protocols (IP protocols), packet-based protocols, time sensitive and non-time sensitive protocols, etc. More particularly, these protocols may include the HART-IP, the OPC UA and any other desired protocols designed for process control communications. Likewise, these protocols may include protocols not traditionally used in process automation, such as general purpose IP protocols, including protocols that support request/response, publish/subscribe, and event-based communications, and data streaming.

The network 80 includes an APL power switch 84 coupled to multiple APL field switches 86 via an APL communication bus or line 88. Generally speaking, the APL power switch 84 includes a power supply that provides power to the APL field switches 86 via the line or bus 88 (which may be set up in a trunk configuration illustrated by the solid line or in a ring configuration illustrated by the solid and dotted lines in the network 80). The field devices 82 communicate with the APL field switches 86 using any desired protocol supported by the APL physical layer (which may be, for example, an Ethernet physical layer or any other physical layer that supports packet based communications, including non-time sensitive or time sensitive networks). Moreover, the field switches 86 communicate using the same protocol and physical layer over the lines 88 to the switch 84, which operates as a gateway to the backbone 10. Additionally, the field switches 86 are connected directly to one or more field devices 82 via spur lines (as defined by the APL physical layer) and communicates with the field devices 82 using the same communication protocol used on the trunk lines 88. The power switch 84 and the field switches 86 operate to communicate packets over the lines 88 between the backbone 10 and the field devices 82. Of course, if desired, the power switch 84 may be coupled directly to a process controller or may be coupled indirectly to a process controller, such as the process controller 11, via the backbone network 10.

Moreover, as illustrated in FIG. 1, the process control system 5 includes one or more operator and/or maintenance workstations 71 that are communicatively connected to the data highway 10. Using the operator or maintenance workstations 71, operators or maintenance personnel may view and monitor run-time operations of the process plant 5, device condition and status information, etc. and may take any diagnostic, corrective, maintenance, and/or other actions that may be required. At least some of the operator or maintenance workstations 71 may be located at various, protected areas in or near the plant 5, and in some situations, at least some of the operator or maintenance workstations 71 may be remotely located, but nonetheless be in communicative connection with the plant 5. Operator and maintenance workstations 71 may be wired or wireless computing devices.

The example process control system 5 is further illustrated as including a configuration application 72a and a configuration database 72b, each of which is also communicatively connected to the data highway 10. Various instances of the configuration application 72a may execute on one or more computing devices (not shown) to enable users to create or change process control modules and download these modules via the data highway 10 to the controllers 11, as well as to enable users to create or change operator interfaces via which an operator is able to view data and change data settings within process control routines. The configuration database 72b stores the created (e.g., configured) modules and/or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, configuration database 72b, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator and maintenance workstations 71 are utilized by operators and maintenance personnel during real-time operations of the process plant 5 (also referred to interchangeably here as "run-time" operations of the process plant 5). Moreover, the process control system 5 may include an asset management system 77 that may collect and process field device and controller data to perform maintenance on the process control system 5 in known manners. The asset management system 77 may include one or more databases for storing and processing collected data and/or may use the databases 72b and 73b and other databases within the plant. The asset management system 77 may also communicate directly with devices, such as the controllers 11, the input output devices 29, the gateway 35, the power switch 84, etc.

The example process control system 5 also includes a data historian application 73a and a data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71).

In some configurations, the process control system 5 includes one or more gateways 76, 78 to systems that are external to the immediate process control system 5. Typically, such systems are consumers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 11 with a finite number of I/O devices 26, 28, 29, field devices 15-24, 40-46, and 82, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-24, 40-46, 35, 52, 55, 58, 70, and 82 via any number of I/O devices 26, 28, 29 to control a process in the plant 5. For example, the process plant 5 may include various physical areas, each having an associated one or more controllers 11 (and associated I/O devices 26, 28, or 29) in communication with an associated set of field devices and networks 15-24, 40-46, 35, 52, 55, 58 and 70 in that physical area.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28 and 29, the field devices 15-24, and other devices and network components 40-46, 35, 52, 55, 58, 70, and 82 are located, disposed, or otherwise included in the field environment 122 of the process plant 5. Generally speaking, raw materials are received and processed in the field environment 122 of the process plant 5 using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator or maintenance workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

FIGS. 2A-2F generally depict communication architectures which may be utilized by field devices, I/O cards, and controllers within a process plant, such as the field devices 15-24, the I/O cards 26, 28, 29, and the controller 11 illustrated in FIG. 1. For ease of illustration, and not for limitation purposes, FIGS. 2A-2F are discussed with simultaneous reference to FIG. 1.

Figure 2A:
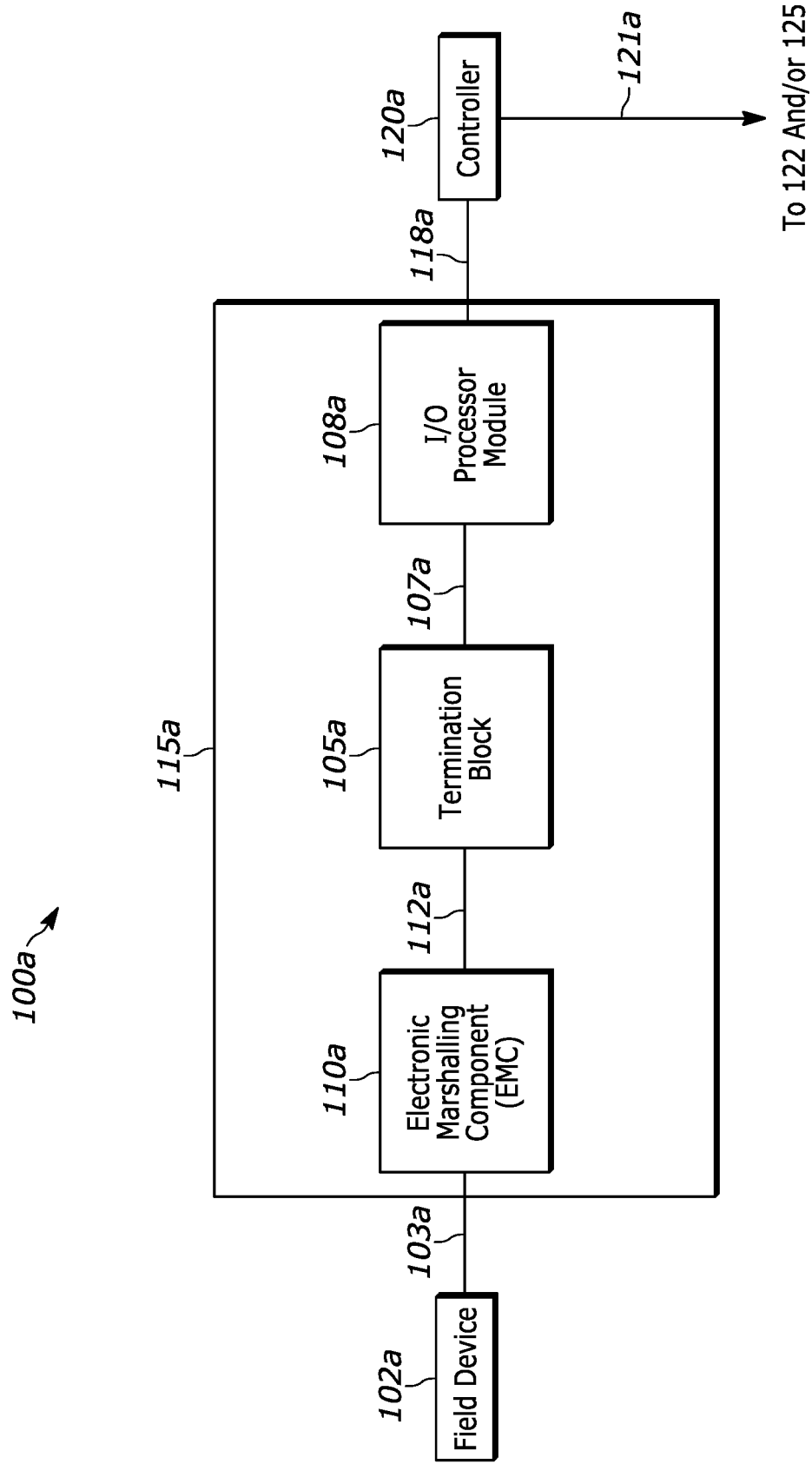
FIG. 2A includes a block diagram of an example control loop which may be included in the process plant of FIG. 1 and in which embodiments of the techniques for non-disruptive, simplex I/O component replacement described herein may be implemented.

FIG. 2A includes a block diagram depicting an example communication architecture of an example process control loop 100a in which a field device 102a is included. The field device 102a may be a smart or intelligent field device (such as one of the field devices 19-24, 82), or may be a legacy field device (such as one of the field devices 15-18). Generally, as used herein, "smart" or "intelligent" field devices are field devices that integrally include one or more processors and one or more memories. On the other hand, as used herein, a "legacy" field device does not include on-board processor(s) and/or on-board memories.

The loop 100a may be integrated or incorporated into a process plant to be utilized in controlling a process therein during run-time operations of the process plant. For example, the loop 100a may be installed or disposed in the field environment 122 of the process plant 5.

Within the example process control loop 100a shown in FIG. 2A, a field device 102a is communicatively connected 103a (e.g., in a wired or wireless manner) to an electronic marshalling device or component (EMC) 110a (e.g., an I/O signal conditioner, a CHARacterization Module or CHARM provided by Emerson Automation Solutions, etc.). The EMC 110a is communicatively connected 112a to a termination block 105a that, in turn, is communicatively connected 107a to an I/O processor module or card 108a. The I/O processor module or card 108a is communicatively connected 118a to a controller 120a, which, in turn, is communicatively connected 121a to the back-end environment 125 and/or the front-end environment 122 of the process plant 5. During on-line operations of the process plant 5, the controller 120a receives values of the signals generated by the field device 102a (e.g., data values generated by the field device 102a) and operates on the received values to control a process within the plant 5, such as by generating control or safety signals based on the received values and sending the control or safety signals to change the operation of the field device 102a and/or of another device (not shown in FIG. 2A). In some cases, the controller 120a may send control and/or informational signals to another controller (also not shown in FIG. 2A), and may send information to and receive information from the back-end environment 125 via the communicative connection 121a. The controller 120a may be a process controller, such as the process controller 11 of FIG. 1, a Safety Instrumented System (SIS) controller or logic solver included in a safety instrumented system supporting the process plant 5, or another type of controller which receives signals from field devices, determines corresponding control or safety signals based on the received field device signals, and transmits the control or safety signals to other components of the process plant 5 to thereby control and/or modify the run-time operations of the industrial process.

In FIG. 2A, the electronic marshalling component 110a, the termination block 105a, and the I/O processor module 108a are depicted as being physically located together in a cabinet or housing 115a (such as an I/O cabinet) that electrically interconnects the electronic marshalling component 110a, the termination block 105a, and the I/O processor module 108a, and/or other components housed within the cabinet 115a via one or more busses, a backplane, or other suitable interconnection mechanism. Of course, the housing of the electronic marshalling component 110a, the termination block 105a, and the I/O processor module 108a in the cabinet 115a as depicted in FIG. 2A is only one of many housing configurations possible.

Figure 2B:
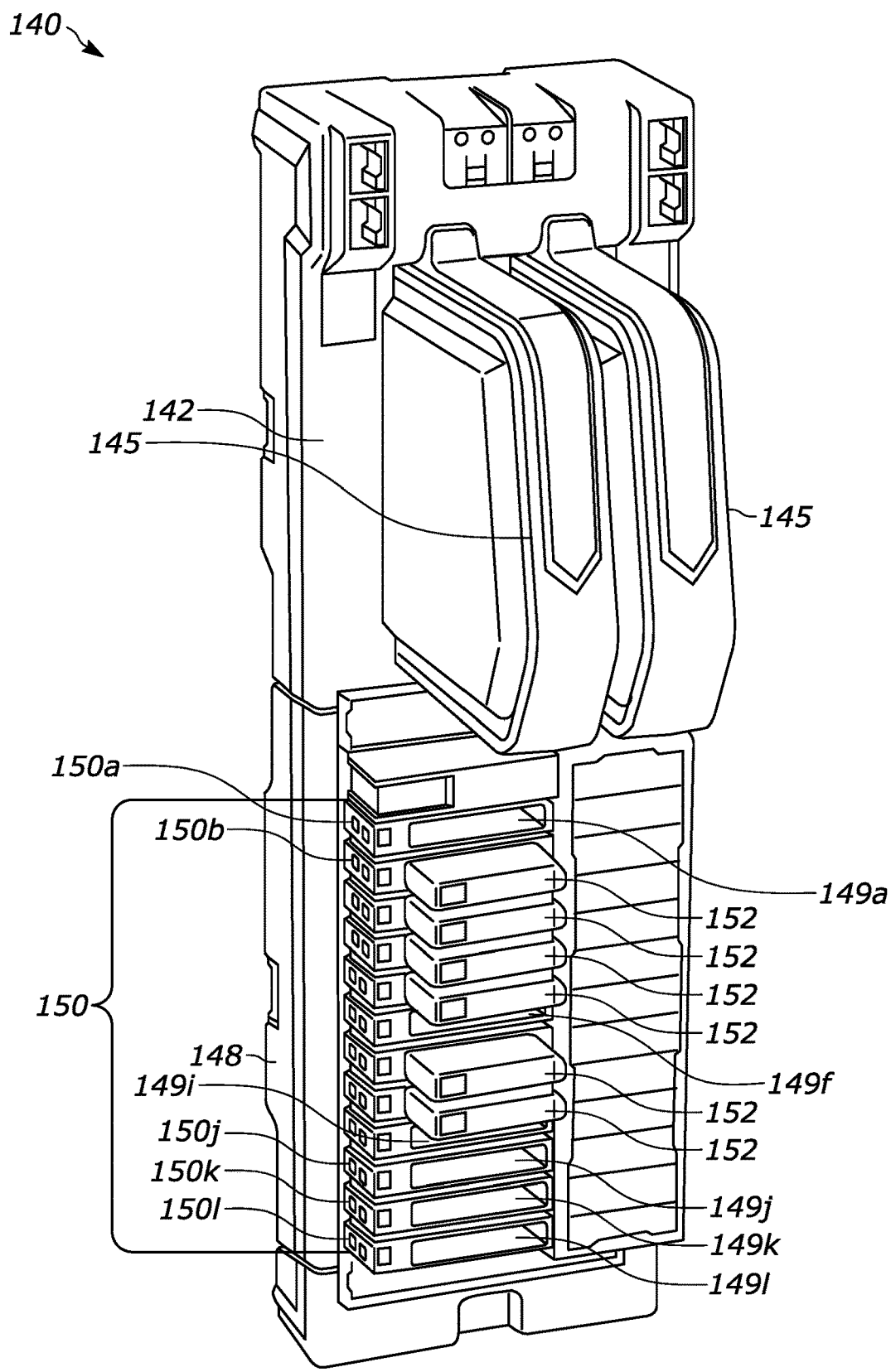
FIG. 2B illustrates an example architecture of an electronic marshalling block, apparatus, or device which may be included in the process plant of FIG. 1.

FIG. 2B illustrates a perspective view of an example electronic marshalling block, I/O apparatus, or I/O device 140 that supports the EMC 110a shown in FIG. 2A, and thus is discussed below with simultaneous reference to FIG. 2A. As previously discussed, the I/O device 29 of FIG. 1 is an example I/O device that provides a mixed physical layer and communication protocol platform, and that can be used to provide communications between a process controller and multiple different field devices via various different physical layers and various different communication protocols. In particular, FIG. 2B illustrates a mixed physical layer and protocol device 140 (which may be the I/O device 29 of FIG. 1) in more detail. More particularly, FIG. 2B depicts a perspective view of an example electronic marshalling or I/O device 140 that supports communications with the multiple different field devices using multiple different physical layers and, if desired, using different communication protocols on the different physical layers. Generally speaking, the I/O device 140 includes an I/O card base or carrier having an upper portion 142 (associated with a head-end unit or controller side of the I/O device 140) and a lower portion 148 associated with a field device side of the I/O device 140. The upper portion 142 of the base includes preconfigured slots (not explicitly shown in FIG. 2B) into which one or more I/O processor modules 145 (which are also referred to interchangeably herein as "I/O cards 145" or "I/O modules 145") are placed or are inserted. For example, the I/O processor module 108a illustrated in FIG. 2A may be one of the I/O processor modules 145 illustrated in FIG. 2B. The upper portion 142 of the I/O card carrier base may support multiple different I/O processor modules 145 to which a process or SIS controller (e.g., the process controller 11 of FIG. 1 or the controller 120a of FIG. 2A) may be connected via a wired or wireless connection (not shown explicitly in FIG. 2B). In the example of FIG. 2B, the upper portion 142 of the I/O card base or carrier supports two I/O processor modules 145, however, more or fewer I/O processor modules 145 could be supported in (inserted into) the base 142. Moreover, the I/O processor modules 145 may be associated with the same or with different communication protocols, may be redundant I/O processor modules that perform the same functionality for one or more different communication protocols, and/or may include at least I/O processor module that is a non-redundant or simplex I/O processor module (e.g., for which there is no other I/O processor module that is simultaneously received into the upper portion 142 of the I/O card base and which may be utilized to provide the functionality of the simplex I/O processor module when the simplex I/O processor module fails). Further, the set of I/O processor modules 145 may include a separate I/O processor module for each different communication protocol supported by the I/O device 140, or may include an I/O processor module 145 that supports multiple different communication protocols using different physical layer structure. Still further, one of the I/O processor modules 145 may be or may include one or more power supplies for one or more different communication protocols, etc.

The I/O processor modules 145 perform communications with a process controller or a safety instrumented system (SIS) controller that is communicatively connected on one side of the I/O device 140 (e.g., the process controller 11 of FIG. 1 or the controller 120a of FIG. 2A) and performs communications with various different electronic marshalling components disposed on the I/O device 140, which marshalling components communicate with field devices on the other side of the I/O device 140 (e.g., one of the field devices 23-24 of FIG. 1 or the field device 102a of FIG. 2A). As such, the I/O processor modules 145 may include specialized or general purpose processors and memories that are programmed to perform various communication functions including receiving and sending communication signals to the process controller, decoding and coding signals received from and sent to field devices using one or more communication protocols, responding to messages from field devices and the process controller using the appropriate communication protocol to communicate information and messages from the controller to the field devices and vice-versa, tracking the identity of and the logical location of field devices coupled to the I/O device 140 (i.e., determining, tracking and storing communication paths and communication protocols that are used to communicate with the field devices connected to the I/O device), etc. The I/O processor modules 145 may also, in some cases, include a power supply or connect to an external power supply and supply power over one or more field device communication networks connected to the I/O device 140.

Additionally, the lower marshalling base 148 electrically and communicatively connects to the upper base 142 (and therefore, to the I/O modules 145) via one or more internal busses (not shown in FIG. 2B). While only one lower base 148 is illustrated in FIG. 2B, multiple lower bases 148 could be serially connected together to connect to the upper base 142. Each of bases 148 (again, only one of which is illustrated in FIG. 2B) supports a plurality of individually configurable channels, wherein each channel includes a dedicated slot 149a-1491 coupled to a dedicated wire termination block 150a-1501 disposed on the base 148. For example, the termination block 105a illustrated in FIG. 2A may be one of the termination blocks 150a-1501 illustrated in FIG. 2B. Each wire termination block 150a-1501 includes wire termination points, connectors or other attachment hardware of any desired type to connect the termination block 150a-1501 to one or more field devices (which may include field device 102a illustrated in FIG. 1), and each termination block 150a-1501 may be configured to receive or to connect to wires or physical layer hardware associated with any of various different physical layers called for by different communication protocols. In some cases, each termination block 150a-150l may be configured to accept wiring or physical layer structure associated with multiple different types of physical layers. As a result, each termination block 150a-150l may include screw wire connectors, spring loaded wire connectors, etc. for each of two, three, four, etc. wires that may be used for or that are compliant with various different types of physical layers (which in turn, support any of various different communication protocols). As an example only, each termination block 150a-150l may include a set of wire connectors that may accept and connect wires associated with one or more of a HART physical layer, a FOUNDATION Fieldbus physical layer, an Ethernet physical layer, an APL physical layer, or any other desired physical layer.

Likewise, each of the slots 149a-149l respectively associated with each termination block 150a-150l is adapted or configured to accept a removable electronic marshalling component (EMC) 152. For example, the ECM 110a shown in FIG. 1 may be one of the ECMs 152. A different ECM 152 may be removably inserted into each different slot 149a-149l and, when inserted into a particular slot 149, may be securely received and electronically connected to the termination block 150 associated with the particular slot 149. For example, FIG. 2B illustrates that the slots 149a, 149f, and 149i-149l have not received any ECMs 152, whereas the slots 149b-149e and 149g-149h have each received a respective ECM 152 therein. While not explicitly shown in FIG. 2B, each slot 149 is also connected via one or more internal busses (within the bases 148 and 142) to the I/O processor modules 145 to enable the I/O processor modules 145 to communicate with each of the ECMs 152 inserted into any of the slots 149. Each EMC 152 also includes a respective processor and a respective memory, wherein the processor may be a general purpose processor or a specific processor (e.g., implemented as an ASIC or some other specialized hardware or firmware processor), and is programmed to perform communication functions with one or more field devices connected to a termination block 150 of the base 148 using a particular communication protocol and physical layer. The processor of each EMC 152 may detect one or more field devices connected to the associated termination block, poll the field device(s) for specific device information using a particular communication protocol, including for example, device identity and configuration information, may store this information in a local memory on the EMC 152 and may communicate this information, as well as device communication path information to the processor module 145 in the head-end unit (which is not explicitly denoted in FIG. 2B). Still further, the processor of each EMC 152 may be programmed to configure and send messages from the processor module 145 to one or more field devices connected to the associated termination block 150 using a particular communication protocol and to receive and decode (if necessary) messages from the one or more field devices connected to the associated termination block 150 and to pass these messages to the processor module 145 (via one of the internal busses in the base units 148 and 142) for processing and communication to the process controller, if needed.

Insertion of various different ones of the electronic marshalling components 152 (EMCs) into the slots 149 operates to connect the internal processor of the EMCs 152 to one of the busses on one side of the EMC 152 (e.g., an input side of the EMC 152) and to the appropriate set of wire terminals of the termination block 150 associated with the slot 149 on another side of the EMC 152 (e.g., an output side of the EMC 152). As a result, an EMC 152, when inserted into a slot 149, will be electrically connected to an I/O processor module 145 on the input side of the EMC 152 via at least one internal bus, and will be communicatively coupled to a process or SIS controller (and/or another external system) via the at least one internal bus and one of the I/O processor modules 145. Still further the EMCs 152 will be connected to one or more field devices on the output side of the module 152 via the termination block 150 for the slot 149 into which the EMC 152 is inserted and the physical layer (e.g., wires) connecting the termination block 150 to the field device(s). Different ones of the EMCs 152 may be configured to use different physical layers and different communication protocols to communicate with one or more field devices. Still further, different types of the EMCs 152 may have a connection structure that connects differently to different internal busses of the I/O device 140. As such, EMCs 152 that use one type of physical layer or communication protocol may connect to a first internal bus, while EMCs 152 that use a second type of physical layer or a second and different communication protocol may connect to a second internal bus.

Thus, different ones of the removable hardware modules or EMCs 152 can be inserted into any of the slots 149 to provide connectivity between each of the EMCs 152 and one or both of the I/O processor modules 145 via one or more internal busses of the I/O device 140, as well as to provide connectivity to one of the termination blocks 150 to which wires from various different field devices may be connected. In this particular example, each of the termination blocks 150 may accept wires associated with various different types of physical layers including, for example, 2-wire physical layers, 4-wire physical layers, physical layers that specify particular thicknesses, types, minimum and maximum lengths of wires, etc., physical layers that call for various types of switches or other physical structure, physical layers that support wireless communications, etc., to thereby connect different types of physical layers to the different EMCs 152 when the EMCs 152 are inserted into different ones of the slots 149. If desired, some of the termination blocks 150 may support a first type of physical layer (e.g., a HART or 4-20 ma physical layer), while others of the termination blocks 150 may support a second type of physical layer (e.g., a Fieldbus or Profibus physical layer), and still other termination blocks 150 may support a third type of physical layer (e.g., an IP, Ethernet or APL physical layer). In other cases, one or more of the termination blocks 150 may have connection structure that is configured to support two, three or more different types of physical layers.

Of course, the EMCs 152 include electrical connection structure that, when inserted into a slot 149, electrically connects to one or more of the internal busses, depending upon the configuration of the module 152, as well as electrical connection structure that electrically connects an EMC 152 to the termination block 150 associated with the slot 149 into which the EMC 152 is inserted. Likewise, each removable hardware EMC module 152 includes a processor of some type (e.g., a general purpose processor, a specifically configured processor such as an ASIC, etc.) and software or firmware that is implemented on the processor to perform communications using a particular communications protocol (and using a particular physical layer). Thus, for example, different ones of the EMCs 152 may be associated with, programmed to implement, or use different communication protocols (and physical layers used for those protocols). Thus, some of the EMCs 152 may be HART protocol modules, which may be conformed to the HART communication protocol, some of the EMCs 152 may conform to or use IP communication protocol which use an APL or an Ethernet physical layer, and some of the EMCs 152 may be FOUNDATION Fieldbus modules, which conform to or implement the FOUNDATION Fieldbus protocol. Each different internal bus of the I/O device 140 may be associated with or conform to a different physical layer and may support different communication protocols, such as a HART communication protocol which uses a HART physical layer and an IP communication protocol which uses an APL physical layer, for example. The support of multiple different protocols (and multiple different physical layers) enables differently configured EMCs 152 (which support different communications protocols and potentially different physical layers) to be inserted into different ones of the slots 149 and to be connected to communicate with different field devices that use these different protocols (and physical layers).

Figure 2C:
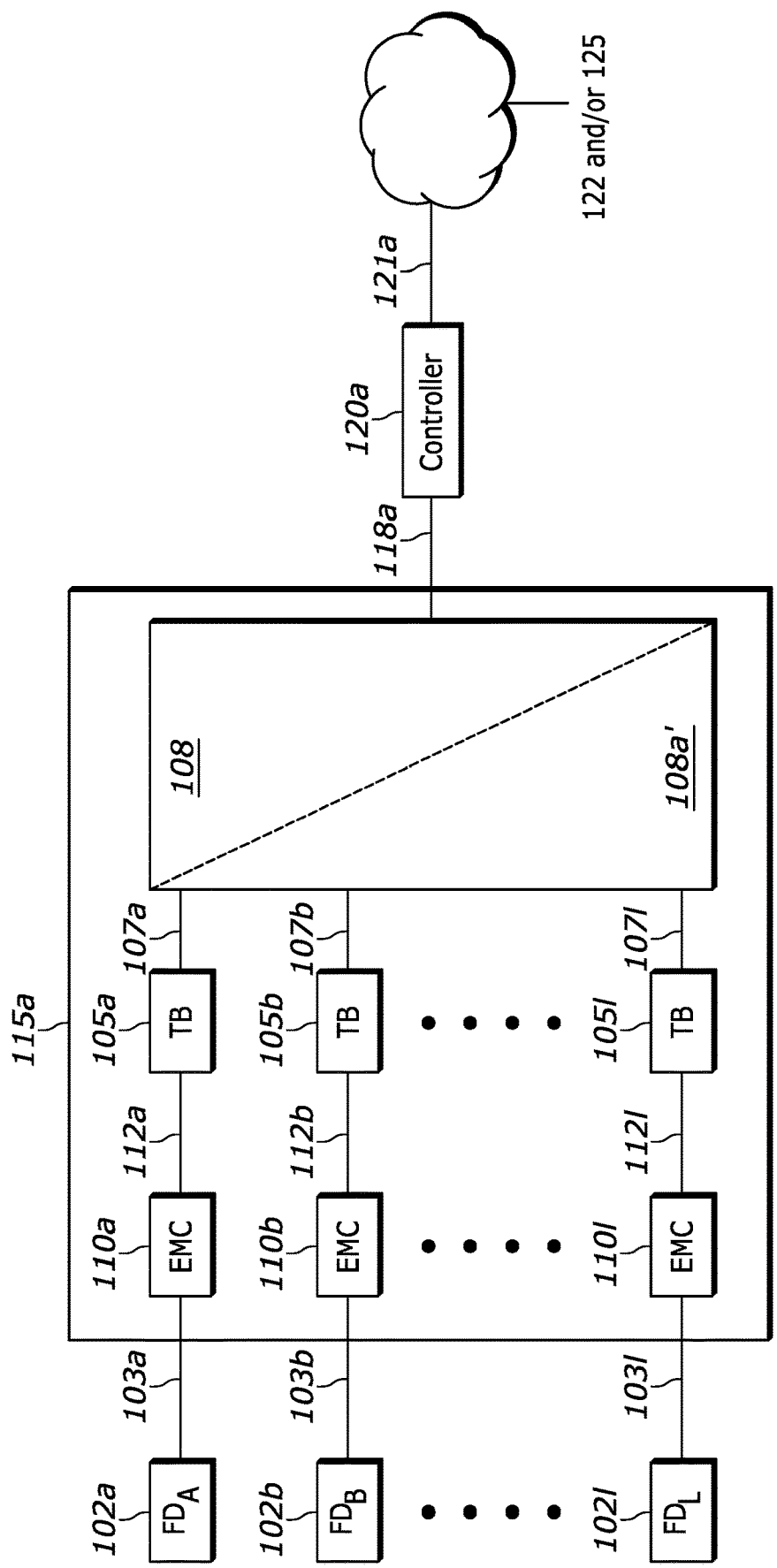
FIG. 2C depicts a block diagram of an implementation of example control loops which may be included in the process plant of FIG. 1 and in which embodiments of the techniques for non-disruptive, simplex I/O component replacement described herein may be implemented.

As should be apparent with reference to FIGS. 2A and 2B, each lower portion 148 of the I/O device 140 supports a plurality of configurable channels, each of which corresponds to an individual EMC 152. Such a configuration is depicted in the example block diagram provided by FIG. 2C. FIG. 2C depicts a multiplicity of field devices 102a-102l, where each of the field devices 102a-102l is communicatively connected 103a-103l (e.g., in a wired or wireless manner) to a corresponding electronic marshalling component 110a-110l. Each of the electronic marshalling components 110a-110l is communicatively connected 112a-112l to a respective termination block 105a-105l that, in turn, is communicatively coupled 107a-107l to redundant I/O processor modules 108a, 108a'. The redundant I/O processor modules 108a, 108a' are communicatively connected 118a to the controller 120a, which, in turn, is communicatively connected 121a to the back-end environment 125 of the process plant 5. The electronic marshalling components 110a-110l, the termination blocks 105a-105l, and the redundant I/O processor modules 108a, 108a' may be included in the I/O device 140, and may all be enclosed in the cabinet 115a. In the embodiment depicted in FIG. 2C, while the lower portion 148 of the I/O device 140 includes 12 termination blocks 105a-105l supporting twelve channels and twelve respective electronic marshalling components (e.g., ECMs 110a-110l), in other embodiments the lower portion 148 of the I/O device 140 may support fewer or more electronic marshalling components, such as 8, 10, 16, 32, etc. Indeed, the lower portion 148 of the I/O device 140 may be configured to support a maximum number of channels and respective electronic marshalling components, but at a particular time may be connected to only a subset of the maximum number of channels and electronic marshalling components. For example, in the example I/O device 140 of FIG. 2B, the lower portion 148 is illustrated as physically being able to support a maximum of 12 channels (e.g., corresponding to termination blocks 150a-150l) and thus receive a maximum of 12 ECMs 150 at any time, but at the particular time depicted in FIG. 2B, the lower portion 148 is supporting only six of the 12 channels, e.g., via engaged ECMs 152b-152e and ECMs 152g-152h. Also as shown in FIG. 2B, each I/O processor module 145 is a multi-channel I/O processor module 145, as the I/O processor module 145 can support the routing of I/O signals over a maximum of 12 channels. Similarly, each I/O processor module 108a, 108a' shown in FIG. 2C also supports multiple channels.

While some portions of the process plant 5 may include centralized marshalling cabinets as described with respect to FIGS. 2A to 2C (e.g., the cabinet 115a depicted in FIG. 2A), in which an electronic marshalling block or device 140 includes one or more I/O card base or carriers upper portions 142 each coupled to one or more lower portions 148 with respective EMCs 152, the presently described process plant 5 may additionally or alternatively include one or more distributed EMC networks that do not centralize all of the components of the marshalling block 140 in a single cabinet or location. Instead, the upper portion 142 may be located in one place (e.g., in the marshalling cabinet 115a), while EMCs 152 and supporting lower portion 148 of the I/O card base or carrier (as will be described) may be remotely located from the upper portion 142 of the I/O card carrier and distributed throughout the field environment 122 of the process plant 5.

Figure 2D:
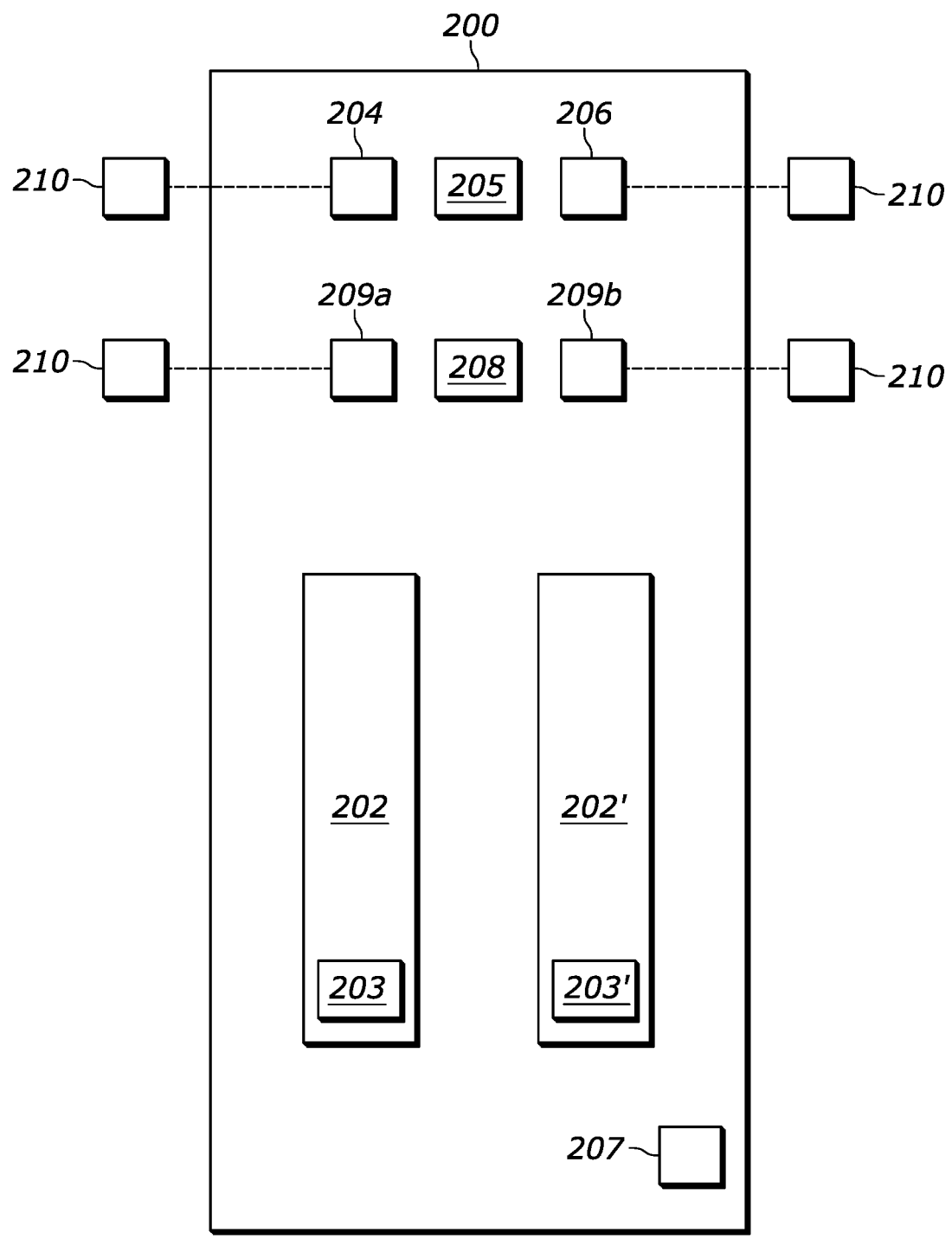
FIG. 2D depicts a block diagram of an example I/O head-end in accordance with an embodiment of an example marshalling architecture.

FIG. 2D depicts a block diagram of an I/O head-end 200 in such a distributed EMC system. The head-end 200 performs many of the same functions as the upper portion 142 of the I/O card carrier depicted in FIG. 2B, namely, the head-end 200 carries (and is communicatively connected to) a pair of redundant I/O processor modules 202, 202' that communicate both with field devices and with one or more controllers, as described above. Each of the I/O processor modules 202, 202' may include a respective memory device 203, 203' that may store computer-readable instructions for operating the I/O cards 202, 202', and/or may temporarily store data being communicated to one or more field devices from a controller, or to a controller from one or more field devices. Additionally, or alternatively, a memory device 208 may store computer-readable instructions for operating the I/O processor modules 202, 202', for coordinating redundancy between the I/O cards 202, 202', for coordinating communications between the head-end 200 and other devices connected thereto (as described below) and/or may temporarily store (e.g., in a database) data being communicated to one or more field devices from a controller, or to a controller from one or more field devices. Lastly, a processor 205 may be coupled to the memory device 208 and may execute the computer-readable instructions stored thereon for the purpose of storing and/or retrieving data from the memory device 208, controlling the I/O processor modules 202, 202', and communicating via a variety of communication ports.

One or more communication ports 207, for instance, may couple the head-end 200 to the one or more controllers (e.g., to the controller 120a), to other process control system components located in the field environment 122 of the plant 5, and/or to other process control system components located in the back-end environment 125 of the plant 5. The communication port(s) 207 may include any suitable communication port implementing any suitable communication protocol but, in an embodiment, is an Ethernet port implementing Ethernet communications. Additional communication ports 204, 206, 209a, and 209b facilitate communication between the head-end 200 and one or more distributed electronic marshaling modules 210, each of which may implement a respective instance or embodiment of the lower portion 148 of the I/O device 140. The communication ports 204 and 206, for instance, may serve primarily as output and input ports, respectively, with the port 204 transmitting data from the head-end 200 to the distributed marshaling modules 210, and the port 206 receiving data at the head-end 200 from the distributed marshaling modules 210. In some situations, a single communication port (e.g., one of the ports 204, 206, 209a, 209b) may serve as both an input and an output port with respect to a particular distributed marshalling module 210 and the head-end 200.

Further, while FIGS. 2B-2D are described above with respect to an I/O device 140 that can support multiple types of physical layers that support different types of communication protocols, it is understood that the principles and techniques discussed with respect to FIGS. 2B-2D can be easily applied to an I/O device which supports only one type of physical layer, such as only a HART-compliant physical layer or only a Fieldbus communications protocol and physical layer. For example, the I/O card 26 and/or the I/O card 28 of FIG. 1 may be embodiments of the I/O device 140 which supports only one type of communications protocol and physical layer. In the single protocol/physical layer embodiments, the I/O device 140 may include only a single type of internal bus to support the respective protocol/physical layer, or the I/O device 140 may include multiple internal busses but only utilize one of the internal busses to support delivery of signals between field devices and controllers.

Figure 3:
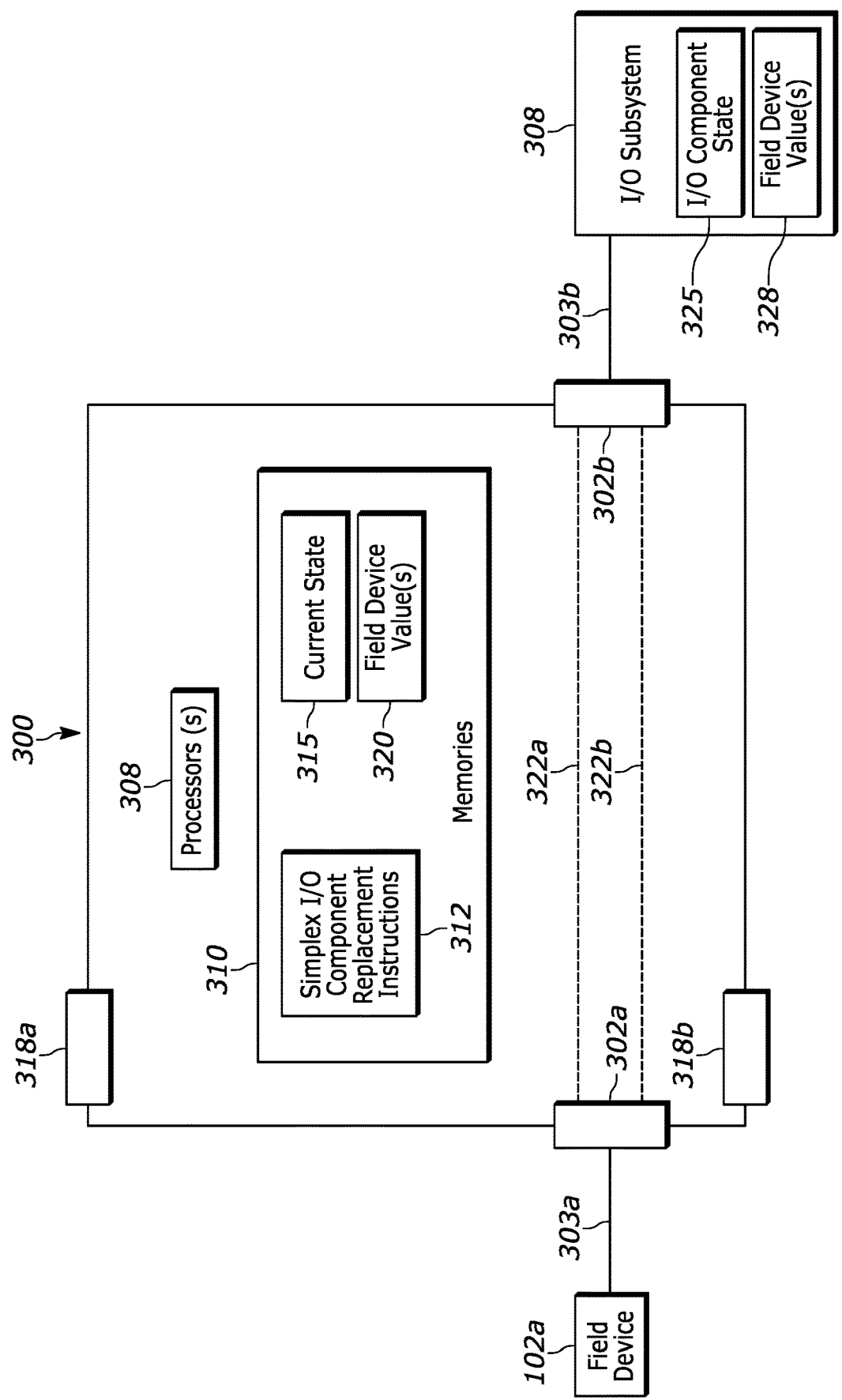
FIG. 3 depicts a block diagram of an example simplex I/O component in which embodiments of the techniques for non-disruptive, simplex I/O component replacement described herein may be implemented.

FIG. 3 depicts a block diagram of an example simplex I/O component 300 in which embodiments of the techniques for non-disruptive, simplex I/O component replacement described herein may be implemented. An "I/O component," as generally utilized herein, refers to a physical unit that performs at least a portion of I/O functionality within a process control system and that can be removed and replaced by plant personnel as a unit, for example, an I/O circuit board, a single channel I/O card or processor module, a multichannel I/O card or processor module, an electronic marshalling component (EMC), an I/O signal conditioner, a CHARM, etc. Such an I/O component is a "simplex I/O component" (also referred to interchangeably herein as a "non-redundant I/O component" or a "non-redundant or simplex I/O component") when no duplicate or other unit within the process control system can be switched over to and utilized (e.g., automatically) in lieu of the simplex I/O component 300 when the simplex I/O component 300 fails. For example, the simplex I/O component 300 may be an EMC 110a or an I/O processing module 108a which is included in the process plant 5, performs respective I/O functions, and for which the process control system does not have any corresponding redundant, physical unit (e.g., a "hot spare") for fault tolerant operations of the I/O functionality provided by the simplex I/O component 300. Generally speaking, and in contrast to the pair of redundant I/O processor modules 145 shown in FIG. 2B and the pair of redundant I/O processor modules 202, 202' shown in FIG. 2D, fault tolerant operations of the I/O functionality provided by a simplex I/O component 300 are not possible. That is, when a simplex I/O component 300 experiences a total failure, it must be replaced or repaired before normal operations (e.g., the run-time I/O functions that the simplex I/O component 300 provides) can be resumed. For ease of illustration, and not for limitation purposes, the simplex I/O component 300 is described herein with simultaneous reference to FIGS. 1 and 2A-2D.

As shown in FIG. 3, the example simplex I/O component 300 includes a first communication interface 302a communicatively connecting 303a the simplex I/O component 300 to a field device, such as the field device 102a, and the simplex I/O component 300 includes a second communication interface 302b communicatively connecting 303b the simplex I/O component 300 to an I/O subsystem 308. In embodiments, one or both of the communicative connections 303a, 303b are direct connections (e.g., with no intermediate nodes). Generally speaking, the I/O subsystem 305 includes one or more other components which, when operating in conjunction with the simplex I/O component 300, collectively operate to deliver I/O signals to/from the field device 102a. For example, the I/O subsystem 305 may include components of the I/O device 140 that are communicatively disposed between the simplex I/O component 300 and the link 118a which communicatively connects the I/O device 140 to the controller 120a. Indeed, in a general sense, the I/O subsystem 305 communicatively connects the simplex I/O component 300 to the controller 120a, where the controller 120a may be a process controller or an SIS controller that receives, via the simplex I/O component 300 and the I/O subsystem 305, data generated by the field device 102a, generates a control signal based on the received data, and sends the control signal to the field device 102a, to another field device, or to another controller to control the operation of the industrial process in the process plant 5.

As such, the I/O subsystem 305, as generally referred to herein, collectively refers to the I/O hardware and software components which are disposed between the simplex I/O component 300 and the controller 120a. For example, when the simplex I/O component 300 is an ECM 152, the I/O subsystem 305 may include the respective termination block 150, the lower portion 148 and the upper portion 142 of the I/O device 140, the I/O processor module 145, and (if utilized) the I/O head-end 200. That is, one or more components of the I/O device 140 other than the ECMs 152 may include the I/O subsystem 305. In another example in which the simplex I/O component 300 is the I/O processor module 145 of FIG. 2B or is the I/O processor module 202 included in the head-end unit 200, the I/O subsystem 305, with respect to the I/O processor module 145, 202, may include the memory 208 and the processor 205 of the head-end unit 200. That is, the head-end unit 200 may include the I/O subsystem 305. Generally speaking, the I/O subsystem 305 communicatively connecting the simplex I/O component 300 to the controller 120a and/or to other components of the process plant 5 typically includes at least one memory and at least one processor.

Similar to the I/O subsystem 305, the simplex I/O component 300 may itself include one or more processors 308, one or more memories 310, and a set of simplex I/O component replacement instructions 312 that are stored on the one or more memories 310 and that are executable by the one or more processors 308. Additionally, the one or more memories 310 of the simplex I/O component 300 store a current state 315 of operation of the simplex I/O component 300, where the state 315 may be changed by the instructions 312 based on the detection of various conditions. In some situations, the instructions 312 may be executable by the processors 308 to cause the simplex I/O component 300 to modify its operations and/or behavior based on a change in state 315, as is described in more detail elsewhere herein.

The simplex I/O component 300 also includes a user interface 318 which, in embodiments, may include a single, physical interface unit via which a user may enter input, or may include multiple, physical interface units via which a user may enter input, e.g., as denoted in FIG. 3 by user interfaces 318a, 318b. The user interface 318 may include any type of interface via which a user can directly provide input to the simplex I/O component 300, such as a touch screen, key pad or keyboard, mouse, dial, switch, push-button, one or more sensors (such as optical sensors, audio sensors, heat sensors, touch sensors, etc.), wireless transceivers, etc. Generally speaking, user input received via the user interface 318 may be indicative of instructions which may, in some situations, modify the operations and behavior of the simplex I/O component 300 to support non-destructive replacement thereof, as is described in more detail elsewhere herein.

In an example scenario, the processor(s) 308 may execute the instructions 312 stored on the memories 310 to cause the simplex I/O component 300 to obtain the data generated by the field device 102a via the first communication interface 302a and send the obtained data to the I/O subsystem 305 via the second communication interface 302b. In some situations, the communications format, protocol, and/or physical layer utilized by the field device 102a differs from the communications format, protocol, and communications layer utilized by the I/O subsystem 305, and in these situations, the simplex I/O component 300 may transform or convert the received field device data prior to sending the transformed and/or converted data to the I/O subsystem 305, e.g., in manners such as described elsewhere herein.

The processor(s) may further execute the simplex I/O component replacement instructions 312 to cause the simplex I/O component 300 to operate to support a non-disruptive replacement of itself. Typically, in known process control systems, when a simplex I/O component needs to be replaced (such as due to a subcomponent failure, an expiration of a standard replacement interval, or for any other reason), the act of physically replacing the I/O component can significantly disrupt (or in some cases, halt) normal process operations which utilize the simplex I/O component to deliver I/O signals. That is, in known process control systems, replacement of a simplex I/O component may be disruptive to the operations of the process control loop of which the simplex I/O component is a part, and in some cases to the industrial process itself. For example, in known process control systems, to replace a simplex I/O component, a technician or other plant personnel must manually configure and set up a temporary bypass around the simplex I/O component so that I/O signals can be delivered to and from the field device 102a via the temporary bypass while the simplex I/O component is being physically replaced or repaired. As this process is largely manual, and as the operations of a control loop (such as the control loop 100a) are often highly dependent on precise timing, a failure of the plant personnel to follow or be aware of the proper bypass procedures and the required timing thereof can lead to needless faults in the executing control loop 100a, which can result in a significant, undesired delay, trips, and/or other undesired effects on the operations of the process plant 5. On the other hand, embodiments of the non-disruptive simplex I/O component replacement techniques described herein do not require any temporary bypass to be configured and utilized when replacing or repairing a simplex I/O component, and accordingly not only reduce the risk incurred by establishing temporary bypasses, but also allow a simplex I/O component 300 to be replaced or repaired with minimal or, in some cases, no disruption to an executing control loop 100a in which the I/O component 300 is included.

To illustrate, consider an example scenario in which the simplex I/O component 300 is operating to deliver I/O signals between the field device 102a and the controller 120a. During normal operations, the simplex I/O component 300 maintains its current state 315 as "IN-SERVICE," "NORMAL," or equivalent. While in the IN-SERVICE state, the I/O component 300 receives data or values generated by the field device 102 (e.g., via communication interface 302a) and transmits signals indicative of the received data or values generated by the field device 102 (e.g., via the communication interface 302b) to the controller 120a at a rate or other timing expected by the controller 120a. As such, for some controller configurations, the I/O component 300 may hold, cache, or temporarily store 320 a received field device value and transmit the stored value to the controller 120a at a time at which the controller 120a expects to receive the field device value (e.g., during a designated time slot or at some designated time). After transmitting the most-recently received field device value, the I/O component 300 may delete the previously stored value 320 from its memory. For other controller configurations, such as for controllers which support streaming and/or publish-subscribe mechanisms, the I/O component 300 may not store or cache any field device values other than the minimal caching needed to support streaming and/or publishing of data.

At any rate, in this example scenario, the simplex I/O component 300 detects a partial degradation in its operations and/or of one of its subcomponents, where the partial degradation does not render the simplex I/O component 300 inoperable. For example, the I/O component 300 may detect that one of two redundant internal paths 322a, 322b via which field device data is delivered from the communications interface 302a to the communications interface 302b has failed, while the other internal path 322a, 322b continues to deliver field device data from the communication interface 302a to the communication interface 302b so that the controller 120a continues to receive, via the I/O subsystem 305, field device data at the times when the controller 120a expects to receive field device data. Additionally or alternatively, the I/O component 300 may detect other types of hardware and/or software degradations which do not cause the I/O component 300 to be inoperable, such as failures of other redundant subcomponents, decreases in performance, increases of abnormal self-diagnostic results and/or recoverable faults, etc. Upon detecting an on-board degradation or partial failure, the simplex I/O component 300 changes its current state 315 to "REDUCED AVAILABILITY" or similar, and informs the I/O subsystem 305 of its changed or updated current state, e.g., in conjunction with transmitting another field data value, or in an independent communication to the I/O subsystem 305. Generally, the REDUCED AVAILABILITY state is indicative of the physical simplex I/O component 300 needing to be physically replaced even though the component 300 is able to maintain delivery of field device data, and thus may provide plant personnel with an indication that a complete failure of the simplex I/O component 300 may be imminent.

Upon being notified that the simplex I/O component 300 is in a REDUCED AVAILABILITY state, the I/O subsystem 305 informs the appropriate subsystems, applications, devices, and/or user interfaces of the process control system so that process plant personnel are notified of the REDUCED AVAILABILITY state of the simplex I/O component 300 and can prepare to physically replace the degraded simplex I/O component 300, preferably before the component 300 degrades to the point of being inoperable or experiences a total failure. In some implementations, upon entering into the REDUCED AVAILABILITY state, the simplex I/O component 300 may activate an indicator (such as a light or other visual indicator, not shown in FIG. 3) on its housing so that plant personnel who are to replace the degraded simplex I/O component 300 can easily identify the particular, degraded simplex I/O component 300 via the activated visual indicator, e.g., within a rack of other components.

When plant personnel arrives at the location of the simplex I/O component 300 with a physical replacement for the simplex I/O component 300, the plant personnel may instruct the degraded simplex I/O component 300, via the integral user interfaces 318a, 318b of the simplex I/O component 300, to enter into a "REPLACEABLE" state of operation. User instructions to enter into the REPLACEABLE state can be of any suitable format that is received by the particular type of on-board user interfaces 318a, 318b of the simplex I/O component 300. For example, to instruct the simplex I/O component 300 to enter into the REPLACEABLE state, a user can activate or toggle a physical switch or push-button disposed on the housing of the simplex I/O component 300, enter an instruction via a touch screen provided by the component 300, simultaneously activate two optical sensors 318a, 318b disposed on opposite sides of the housing of the component 300, etc.

Responsive to the received instruction, the simplex I/O component 300 updates its current state 315 to REPLACEABLE, and indicates to the I/O subsystem 305, via the communication interface 302b and link 303b, that its current operating state is REPLACEABLE. The simplex I/O component 300 may indicate the update or change to its current operating state to REPLACEABLE in conjunction with delivering field data to the I/O subsystem 305, or in a separate notification. Generally speaking, the REPLACEABLE state of the simplex I/O component 300 indicates to the I/O subsystem 305 that a physical removal and replacement of the simplex I/O component 300 is imminent, and thus at any time in the near future, the simplex I/O component 300 may appear, to the I/O subsystem 305, as going off-line. That is, the REPLACEABLE state of the simplex I/O component 300 informs the I/O subsystem 305 that at some time in the near future, the I/O subsystem 305 may not receive any communications from the simplex I/O component 300 and, unlike an unexpected hard (e.g., total or complete) failure of the simplex I/O component 300, the simplex I/O component from the perspective of the I/O subsystem 305 (i.e., the replacement for the physical simplex I/O component 300) is expected to return on-line in a relatively short amount of time. Typically, the time required for plant personnel to remove and replace a physical simplex I/O component is of a relatively short duration, e.g., seconds or minutes.

Note that while in this example scenario, the simplex I/O component 300 enters into the REPLACEABLE state from the REDUCED AVAILABILITY state, in other scenarios the simplex I/O component 300 may enter into the REPLACEABLE state directly from an IN-SERVICE state. For example, a technician or plant personnel may want to pre-emptively replace the physical simplex I/O component 300, upgrade the physical simplex I/O component 300, or physically replace the simplex I/O component 300 for any reason, and may indicate as such via the user interface(s) 318 of the component 300 while the component 300 is operating normally. In these and other situations, the simple I/O component may include one or more redundant subcomponents, or may not include any redundant subcomponents. Of course, and generally speaking, the simplex I/O component 300 may receive the instruction, via the user interface(s) 318, to enter into the REPLACEABLE state while the component 300 is in any operating state.

Upon receiving the indication from the simplex I/O component 300 that the component 300 is in the REPLACEABLE operating state, the I/O subsystem 305 may store an indication 325 thereof, and the I/O subsystem 305 may transition into operating in a temporary, safe mode while the stored indication 325 indicates that the simplex I/O component 300 is in the REPLACEABLE state. For example, based on the stored indication 325 of the simplex I/O component 300 being in the REPLACEABLE state, the I/O subsystem 305 may continually temporarily store, cache, or hold 328 a most recently received data value that was generated by the field device 102a and received from the simplex I/O component 300. For instance, the I/O component 300 may store 320 at least one data value that was most recently generated by the field device 102a and received by the simplex I/O component 300, and may store or hold the value(s) 320 in its memories 310 for a time duration greater than a time duration (e.g., a configured periodicity, designated time slot, or other designated time interval) after which the controller 120a expects to receive data values generated by the field device 102a. As such, if and when the I/O subsystem 305 fails to receive expected transmissions from the simplex I/O component 300, based on the stored indication 325 that the I/O component 300 is in the REPLACEABLE state, the I/O subsystem 305 transmits the stored field device data value 328 to the controller 120a, e.g., during a time slot or at a time expected by the controller 120a, thereby maintaining seamless, non-disruptive process control loop 100a operations even though the simplex I/O component 300 is being physically removed and replaced. In a sense, when the simplex I/O component 300 indicates to the I/O subsystem 305 that the component 300 is in the REPLACEABLE state and the simplex I/O component 300 stops communicating with the I/O subsystem 305 (e.g., due to the physical unit being removed and replaced), the I/O subsystem 305 retrieves the most recently received field device value from its memory 328 and sends it to the controller 120a during a time slot or time period via which the controller 120a expects to receive the field device value. In contrast, during normal run-time operations when the simplex I/O component 300 has not indicated to the I/O subsystem 305 that it is in a REPLACEABLE operating state (e.g., the simplex I/O component 300 is operating in the NORMAL operating state from the perspective of the I/O subsystem 305) and the I/O subsystem 305 fails to receive expected communications from the I/O component 300 (e.g., due to a hard or unrecoverable failure), the I/O subsystem 305 may store an indication of the simplex I/O component 300 being in an "OUT-OF-SERVICE" state, and may perform alternate mitigation and recovery procedures.

Figure 4:
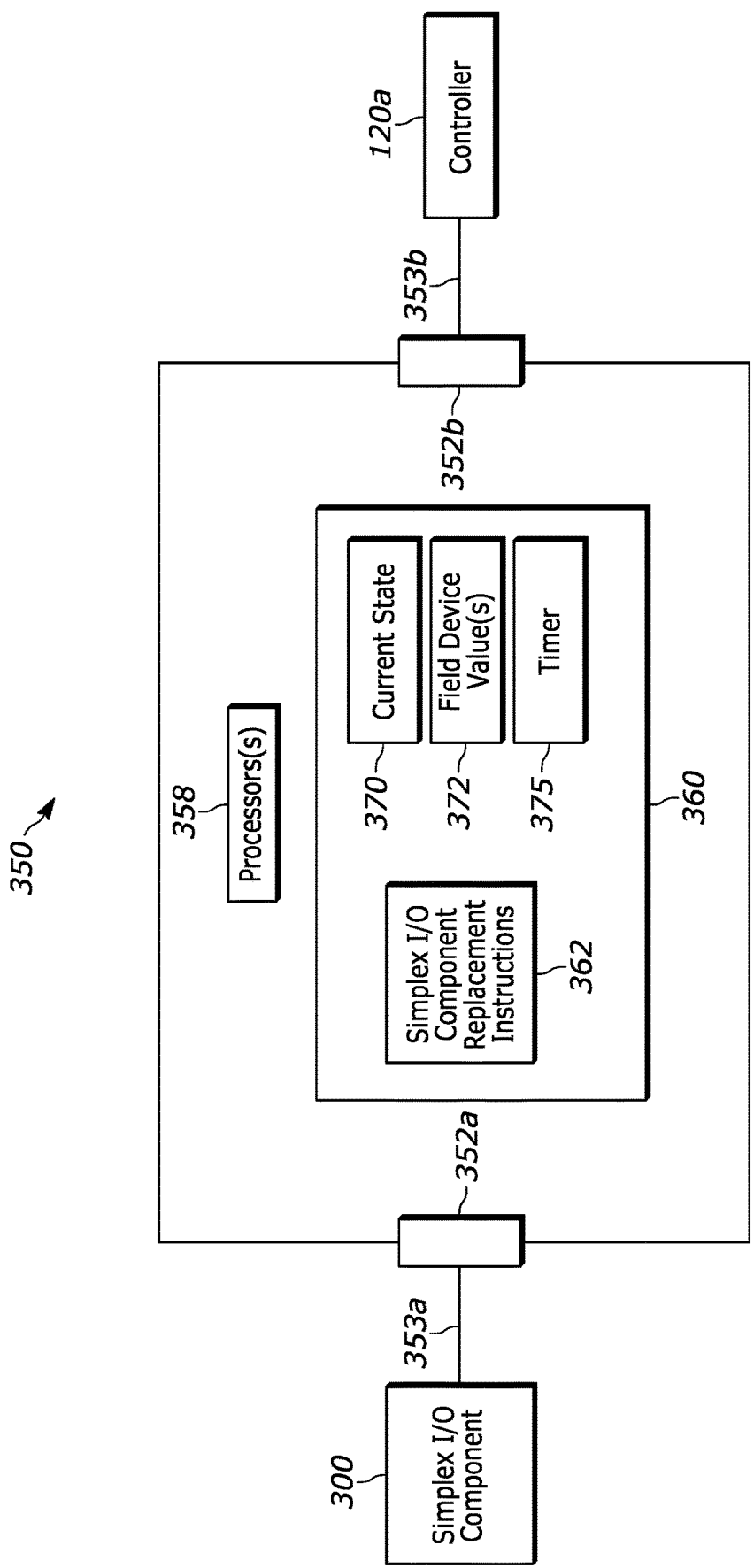
FIG. 4 depicts a block diagram of an example I/O subsystem communicatively connected to a simplex I/O component and in which embodiments of the techniques for non-disruptive, simplex I/O component replacement described herein may be implemented.

FIG. 4 depicts a block diagram of an example I/O subsystem 350 in which embodiments of the techniques for non-disruptive, simplex I/O component replacement described herein may be implemented. The I/O subsystem 350 may be communicatively disposed between a simplex I/O component and a controller in a process control loop or in a safety instrumented system loop of the process plant 5. For example, the I/O subsystem 350 may be the I/O subsystem 305 communicatively disposed between the simplex I/O component 300 and the controller 120a. For ease of illustration, and not for limitation purposes, the example I/O subsystem 350 is described herein with simultaneous reference to FIGS. 1, 2A-2D, and 3.

As shown in FIG. 4, the example I/O subsystem 350 includes a first communication interface 352a communicatively connecting 353a the I/O subsystem 350 to a simplex I/O component, such as the simplex I/O component 300, and the I/O subsystem 350 includes a second communication interface 352b communicatively connecting 353b the I/O subsystem 350 to a process controller or SIS controller, such as the controller 120a. In embodiments, one or both of the communicative connections 353a, 353b are direct connections (e.g., without any intermediate nodes). As previously discussed, the I/O subsystem 350 includes one or more components which, when operating in conjunction with the simplex I/O component 300, collectively operate to deliver I/O signals to/from the field device 102*a*. As such, the I/O subsystem 350 may include I/O hardware and software components disposed between the simplex I/O component 300 and the controller 120*a*.

As shown in FIG. 4, the I/O subsystem 350 may include one or more processors 358, one or more memories 360, and a set of simplex I/O component replacement instructions 362 that are stored on the one or more memories 360 and that are executable by the one or more processors 358 to support non-disruptive replacement of simplex I/O components. Additionally, the one or more memories 360 of the I/O subsystem 350 may store a current operating state 370 of the simplex I/O component 300, where the current state 370 may be tracked and changed by the instructions 362 based on the detection of various conditions. For example, the memory location(s) storing the current operating state 370 shown in FIG. 4 may be the memory location(s) storing the current operating state 325 shown in FIG. 3. In some situations, the instructions 362 may be executable by the processor(s) 358 to cause the I/O subsystem 350 to modify its operations and/or behavior based on the current, tracked state 370 of the simplex I/O component 300 or based on a change thereto, as is described in more detail elsewhere herein. Further, for some specific states 370 of the simplex I/O component 300, such as the REPLACEABLE state, the I/O subsystem 350 stores, in its memories 360, at least one most recently received data value 372 generated by the field device 102*a* and received from the simplex I/O component 300, and continually updates the stored field device value(s) 372 each time the I/O subsystem 350 receives, from the simplex I/O component 300, another data value generated by the field device 102*a*. For example, the memory location(s) storing the most recently received data value(s) 372 shown in FIG. 4 may be the memory location(s) storing the most recently received field device data value(s) 328 shown in FIG. 3. Still further, in some implementations, the I/O subsystem 350 may include an I/O component replacement timer 375 which the I/O subsystem 350 may utilize in conjunction with the non-disruptive replacement of the simplex I/O component 300. A discussion of the use of the timer 375 is provided elsewhere with this disclosure.

It is noted that while FIG. 4 illustrates the I/O subsystem 350 as being communicatively disposed between one field device 102*a* and one controller 120*a* and thus supports a single channel, this is for clarity of illustration purposes only. In some embodiments (not shown in FIG. 4), the I/O subsystem 350 may be communicatively disposed between multiple field devices and multiple controllers of various control and/or SIS loops, the I/O subsystem 350 may be communicatively disposed between multiple field devices and a single controller of a same control or SIS loop, etc. That is, in these embodiments, the I/O subsystem 350 may be communicatively connected to multiple simplex I/O components 300 and may service multiple channels of multiple loops. In these embodiments, the I/O subsystem 350 may maintain the respective current operating state 370 of each simplex I/O component to which it is communicatively connected, as well as may store one or more current (e.g., most recently received) data values 372 of each field device 102*a* being serviced by the I/O subsystem 350. Further, the I/O subsystem 350 may include a respective replacement timer 375 corresponding to each simplex I/O component 300 to which it is communicatively connected. For example, the I/O subsystem 305 may include a multi-channel I/O processor module or card 108*a*, and may store and update a respective current operating state, a most recently received data value, and optionally respective replacement timer corresponding to each of the multiple, supported channels.

Figure 5:
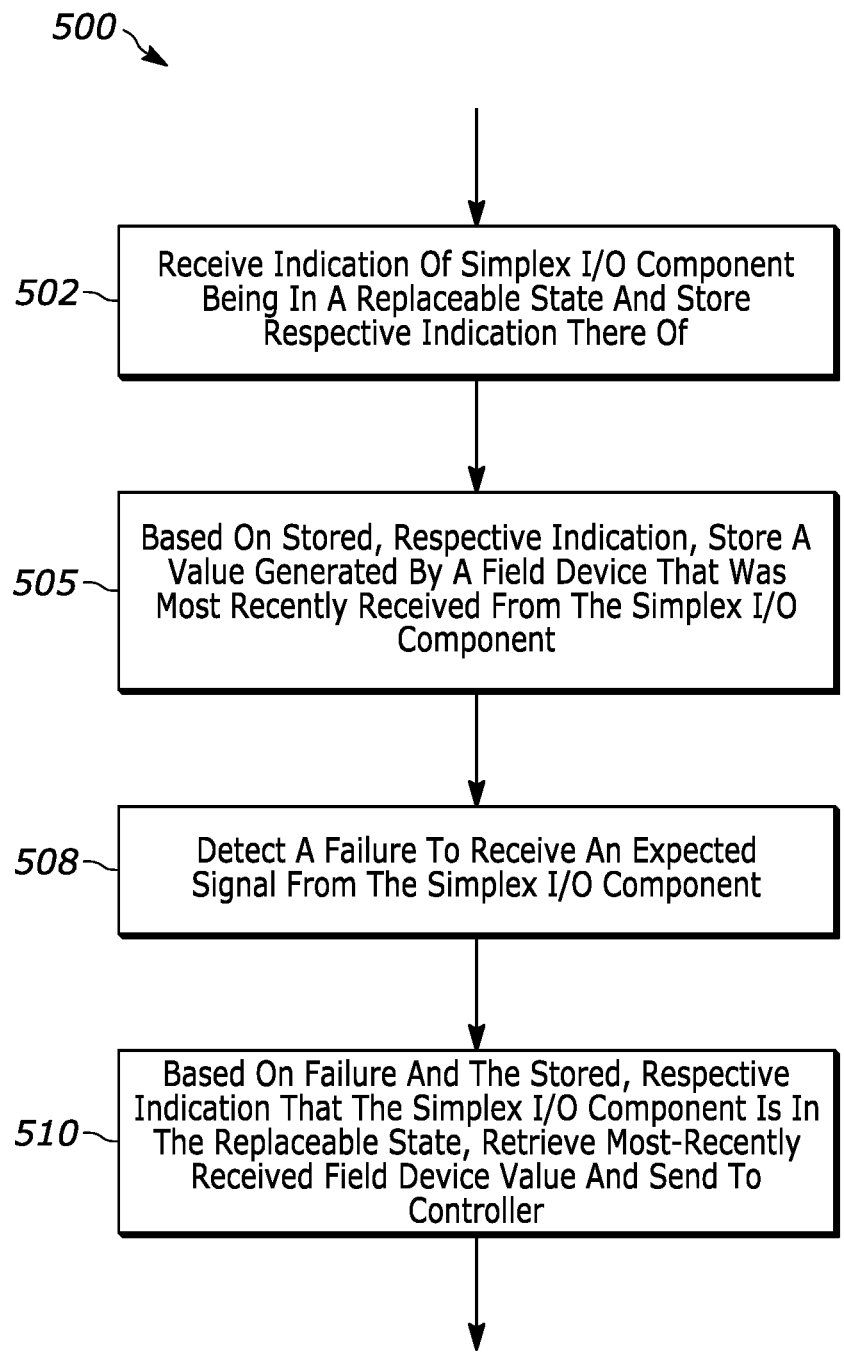
FIG. 5 is a flow diagram depicting an example method in accordance with at least some of the described embodiments of the techniques for non-disruptive, simplex I/O component replacement.

As described above, the set of simplex I/O component replacement instructions 362 is executable by the one or more processors 358 of the I/O subsystem 350 to support non-disruptive replacement of simplex I/O components. Though a variety of methods which may be implemented via execution of the instructions 362 are apparent from the description above, in an embodiment, the instructions 362 are executable to perform an example method 500 for the non-disruptive replacement of a simplex I/O component of a process control system of an industrial process plant, a flow diagram of which is depicted in FIG. 5. The example method 500 may be performed by an I/O subsystem of the process control system such as the I/O subsystem 305 or the I/O subsystem 350, e.g., while the process control system of the process plant is executing during run-time to control an industrial process and/or while the SIS is executing during run-time to support the process control system and process plant. For example, the I/O subsystem may be communicatively coupled to a field device via a simplex I/O component, and the I/O subsystem may communicatively couple the simplex I/O component to a controller. The controller may be a process controller or an SIS controller that is configured with and executes control logic or control routines to generate a control signal based on the received field device data (e.g., via the simplex I/O component and the I/O subsystem) and send the control signal to the field device, another field device, or another controller to control the operation of the industrial process. For instance, the controller, I/O subsystem, simplex I/O component, and the field device may be included in a control loop which executes to control at least a portion of the industrial process. For ease of illustration and not for limitation purposes, the method 500 is discussed below with simultaneous reference to FIGS. 1, 2A-2D, 3, and 4. Further, in some embodiments, the method 500 may include more, less, and/or alternate steps than depicted in FIG. 5 and discussed herein.

At a block 502, the method 500 may include receiving, by an I/O subsystem of a process control system, an indication of a simplex I/O component being in a REPLACEABLE operating state (e.g., such as previously discussed). Receiving 502 the indication of the simplex I/O component being in the REPLACEABLE state may include receiving, from the simplex I/O component, an indication that the simplex I/O component is currently in or has changed to be in the REPLACEABLE state. For example, the simplex I/O component may enter into the REPLACEABLE state responsive to a user instruction received by the simplex I/O component via user interface(s) 318, and may indicate the new state or the state change to the I/O subsystem, thus causing the I/O subsystem to receive 502 the indication. Additionally at the block 502, the method 500 may include storing, by the I/O subsystem, a respective indication that the simplex I/O component is in the REPLACEABLE state. For example, the I/O subsystem may store the indication of the simplex I/O component's current, REPLACEABLE operating state in memory storage 370, e.g., by overwriting or replacing the indication of the most recently stored or recorded state with the indication of the REPLACEABLE state, or by otherwise writing the indication to a suitable memory location 370.

While the simplex I/O component remains in the REPLACEABLE state, the I/O subsystem may continue to receive transmissions (e.g., signals which include field device-generated values and/or other data generated by the field device, heartbeat or status messages, etc.) as and when expected per the configuration of the control routines executing in the controller, thereby maintaining run-time operations of the control loop in which the field device, the simplex I/O component, the I/O subsystem, and the controller are included. For example, as configured for the control loop, the field device may transmit data values on a predetermined schedule (e.g., during one or more periodically occurring time slots or at one or more specific times, which may or may not reoccur periodically), the field device may transmit or send data only when some value or condition at the field device has changed (e.g., on an event-basis), or the field device may stream data values as the data values are sensed or generated by the field device. At any rate, as the field device generates and transmits data values to the simplex I/O component, the simplex I/O component, although in the REPLACEABLE state, continues its normal run-time operations of providing the received field device data values to the I/O subsystem (e.g., in manners such as discussed elsewhere herein). Further, the I/O subsystem continues its normal run-time operations of providing the received field device data values to the controller, thereby maintaining the normal, run-time execution of the control loop.

However, at a block 505, the method 500 may include, based on the simplex I/O component being in the REPLACEABLE state (e.g., as indicated by the locally stored state 370 at the I/O subsystem), the I/O subsystem also continually stores or records (e.g., in another memory storage location 372) at least one value that was generated by the field device and most recently received from the simplex I/O component. Indeed, the I/O subsystem may update the stored, most recently received field device value(s) 372 as I/O subsystem receives a new or updated field device data value from the simplex I/O component.

At a block 508, the method 500 may include, subsequent to storing 505 the most recently received data value generated by the field device, detecting, by the I/O subsystem, a failure to receive an expected transmission or signal from the simplex I/O component. For example, the I/O subsystem may fail to receive, from the simplex I/O component, an expected transmission or signal in which a field device value is included, the I/O subsystem may fail to receive an expected heartbeat signal from the simplex I/O component, etc. For instance, the I/O subsystem may not receive any transmission from the simplex I/O component at a time at which the transmission is expected (inclusive of any buffer or hysteresis wait time). That is, the I/O subsystem may detect that the simplex I/O component is uncommunicative. Typically, failing to receive an expected transmission 508 while the I/O simplex component is in the REPLACEABLE state may occur when the plant personnel has physically removed the simplex I/O component and the replacement physical simplex I/O component has not yet been installed/inserted, and/or has not yet fully initialized.

Upon detecting 508 the failure to receive the expected transmission from the simplex I/O component, rather than changing the stored state 370 of the simplex I/O component to "OUT-OF-SERVICE," "DISCONNECTED," or equivalent and ceasing to provide any field device values to the controller, instead, based on the stored indication of the REPLACEABLE state of the simplex I/O component (e.g., in the memory location 370), the method 500 may include, at a block 510, retrieving the stored, most recently received data value that was generated by the field device (e.g., from the memory location 372), and sending or otherwise providing the retrieved data value to the controller, to thereby continue or maintain run-time control loop operations in spite of the non-communicative simplex I/O component. For example, at the block 510, the I/O subsystem may retrieve (e.g., from the memory location 372) and transmit the most recently received field device data value to the controller, e.g., at a time or during a time interval at which the controller is configured to receive field device data. Further, the method 500 may continue to store 505 (e.g., in the memory location 370) the indication of the simplex I/O component being in the REPLACEABLE state even though one or more expected transmissions have not been received from the simplex I/O component. For example, the I/O component 300 may store or hold the field device value(s) 372 over a time duration greater than a time duration (e.g., a configured periodicity, re-occurrences of designated time slots, or other designated time interval) after which the controller 120a expects to receive data values generated by the field device 102a. If a second time slot or designated time at which the controller expects to receive data values generated by the field device 102a occurs and the simplex I/O subsystem is still indicated 370 as being in the REPLACEABLE state, the I/O subsystem may again retrieve and send 510 the most recently received field device value stored 372 locally at the I/O subsystem.

As the I/O subsystem 305 continue to provides the controller 120a with a field device value during the time slot or at the time at which the controller 120a expects to receive a field device value (e.g., as configured) even though the simplex I/O component 300 is uncommunicative (e.g., due to being physically replaced), the controller 120a can continue execution of control routines based on the provided field device value to maintain execution of the control loop (e.g., to control the industrial process) based on the retrieved, most recently received field device value provided by the I/O subsystem 305. Indeed, with the novel techniques disclosed herein, the controller 120a may not even be aware that the simplex I/O component is being physically replaced.

Additionally, the duration of time required for plant personnel or a field technician to physically remove, replace, and initialize a simplex I/O component is minimal (e.g., typically only a few minutes, such as less than ten, five, three, or two minutes, or in some situations, as short as several seconds, such as less than a minute, less than 30 seconds, etc.) and, by using the techniques described herein, the technician provides advance notice (e.g., to the I/O subsystem) of an imminent physical removal and replacement of the simplex I/O component by indicating as such directly via the user interfaces 318 of the simplex I/O component 300, e.g., when the technician is in the field 122 and is physically proximate to the component 300 which is to be replaced. As such, in most situations, to maintain normal execution of the control routines or control logic executing in the controller 120a (and thereby maintain normal operations of the control loop), the I/O subsystem 305 may only need to provide the controller 120a with the stored field device value once (e.g., during only one occurrence of a designated time slot or at only one specific time at which the controller expects to receive a field device value) prior to the replacement simplex I/O component fully initializing and coming on-line to resume providing actual, live data values generated by the field device. In some cases, the I/O subsystem 305 may only need to provide the controller 120a with the stored field device value at most twice (e.g., during at most two subsequent occurrences of designated time slots or specific times at which the controller 120a expects to receive field device values) prior to the replacement simplex I/O component fully initializing and coming on-line to resume providing actual, live data values generated by the field device. Further, even though the I/O subsystem sends a previously obtained and stored field device value to the controller (and not a field device value that is generated by and obtained in real-time from the field device), a control loop is typically configured to absorb an occasional errant, out-of-range, or incorrect field device value (as well as other types of anomalies), so that the control loop is able to maintain the operation of the control loop within tolerances without the process becoming uncontrolled and/or without the occurrence of any disruptive mitigation actions such as safety trips. Still further, due to the robustness of control routine and control loop configurations, the controller can recover, recalibrate, and/or more accurately control the execution of the control loop based on actual or live data values generated by the field device after the replacement simplex I/O component has fully initialized to an IN-SERVICE operating state and begins to transmit live field device data values to the I/O subsystem for delivery to the controller. In contrast, currently utilized simplex I/O component replacement techniques are simply not able to provide these advantages. For example, using current techniques, a field technician must coordinate with the back-end environment operators who are monitoring the executing process to configure, time, and execute an installation and usage of a manual bypass for the target simplex I/O component, and the subsequent removal of the manual bypass and transition to the replacement simplex I/O component, thus incurring a significant risk of tripping and/or other system actions which are disruptive to the executing process.

On the other hand, by using the novel techniques disclosed herein, a field technician needs only to inform the system of the imminent replacement of the simplex I/O component by providing an indication of such via the user interface 318 of the simplex I/O component, and then simply removing and replacing the simplex I/O component. No manual bypass is needed, no coordination with control system operators is required, and no additional bypass hardware and/or software needs to be installed and un-installed. Using the techniques described herein, the system has advance notice of the simplex I/O component replacement, and thus automatically transitions into operating in a mode that is non-disruptive to the control loop while the component is being removed and replaced, thus reducing or even eliminating the risk of trips and other system responses which are disruptive to the industrial process. Further, the total elapsed time and personnel required to remove and replace the simplex I/O component is greatly reduced relative to the time and personnel utilized to perform current replacement techniques.

At any rate, and returning again to FIG. 5, in some embodiments, the method 500 may further include (not shown) activating a timer upon receiving 502 the indication that the simplex I/O component is in the REPLACEABLE state. For example, the I/O subsystem 350 may activate the timer 375 upon recording 370 that the simplex I/O component is in the REPLACEABLE state. The timer duration may be configured and modifiable, for example. Generally speaking, the timer may safeguard the I/O subsystem from perpetually (and perhaps erroneously) viewing the simplex I/O component as continuously being in (and not exiting) the REPLACEABLE state. For example, when the I/O subsystem receives another transmission from the simplex I/O component prior to the expiration of the activated timer, the method 500 may include deactivating the timer, clearing the stored indication 370 of the simplex I/O component being in the REPLACEABLE state, and optionally storing 370 an indication that the simplex I/O component is now in an operating state corresponding to the received transmission (e.g., IN-SERVICE). In another example, if the timer expires prior to receiving any transmission from the simplex I/O component (e.g., the simplex I/O component remains uncommunicative), the method 500 may include clearing the stored indication 370 of the simplex I/O component being in the REPLACEABLE state, and optionally storing 370 an indication that the simplex I/O is in an OUT-OF-SERVICE state and initiating recovery and/or mitigation procedures. Of course, the method 500 may include deactivating the timer 375 and clearing the stored indication 370 of the simplex I/O component being in the REPLACEABLE state upon detecting occurrences of other events to thereby ensure the fidelity of the stored simplex I/O component operating state 370 and safeguard against any race conditions which may occur between the simplex I/O component and the I/O subsystem during the physical replacement of the simplex I/O component.

In a similar manner, the I/O subsystem may responsively clear the stored indication 370 that the simplex I/O component is in the REPLACEABLE state upon detecting occurrences of other events. For example, upon receiving, by the I/O subsystem, an indication that the simplex I/O component is (back) on-line (e.g., has initialized and is in the IN-SERVICE state, and/or again is providing actual field device data values in real-time), the I/O subsystem may clear the stored indication 370 that the simplex I/O component is in the REPLACEABLE state, and optionally may record 370 that the simplex I/O component is in the IN-SERVICE state and clear any stored, most-recently received field data values 372.

It is noted that the method 500 is described above as being performed by an I/O subsystem, one of ordinary skill in the art will appreciate that any and all of the techniques described with respect to the method 500 may be implemented at the controller or at a Safety Instrumented System controller or logic solver. For example, and referring to FIG. 1, the controller 11 may perform at least some of the techniques disclosed herein when the controller 11 and a field device 82 are communicatively connected via an advanced physical layer or other physical layer that supports packet based protocols.

Other Considerations

It is noted that while the apparatus, systems, and methods described herein are described with respect to a process control system 5, any one or more of the apparatus, systems, and methods described herein are equally applicable to a process control safety information system of a process control plant, such as the DeltaV SIS™ product provided by Emerson Automation Solutions. For example, a standalone process control safety system or an integrated control and safety system ("ICSS") may be configured using any one or more of the apparatuses, systems, and methods described herein.

Additionally, when implemented in software (e.g., computer-readable instructions), any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

The particular features, structures, or characteristics of any specific embodiment may be combined in any suitable manner and in any suitable combination with one or more other embodiments, including the use of selected features without corresponding use of other features. It is to be understood that other variations and modifications of the embodiments of the present disclosure described and illustrated herein are possible in light of the teachings herein and are to be considered part of the spirit and scope of the present disclosure.

What is claimed:

1. A simplex Input/Output (I/O) component included in a process control system operating to control an industrial process in a process plant, the simplex I/O component comprising:
   a user interface;
   a first communication interface communicatively connecting the simplex I/O component to a field device disposed in the process plant; and
   a second communication interface communicatively connecting the simplex I/O component to an I/O subsystem, the I/O subsystem communicatively connected to a controller that receives, via the simplex I/O component and the I/O subsystem, data generated by the field device, generates a control signal based on the received data, and sends the control signal to the field device, another field device, or another controller to control the operation of the industrial process; and
   the simplex I/O component configured to:
      obtain the data generated by the field device via the first communication interface and send the obtained data to the I/O subsystem the second communication interface;
      receive, via the user interface of the simplex I/O component, an instruction to enter into a replaceable state of operation, the replaceable state of operation indicative of an imminent physical removal and replacement of the simplex I/O component; and
      responsive to the received instruction, enter into the replaceable state and send, via the second communication interface to the I/O subsystem, an indication of the simplex I/O component being in the replaceable state to thereby cause the I/O subsystem to, upon a subsequent failure of the I/O subsystem to receive an expected signal from the simplex I/O component, and based on the indicated replaceable state of the simplex I/O component, store a most recently received data value generated by the field device for sending to the controller.

2. The simplex I/O component of claim 1, wherein the simplex I/O component is a simplex electronic marshalling component, a simplex I/O signal conditioner, a simplex single channel I/O card, or a simplex multichannel I/O card.

3. The simplex I/O component of claim 1, wherein the simplex I/O component is included in an electronic marshalling system of the process control system.

4. The simplex I/O component of claim 3, wherein the I/O subsystem is included in a head-end unit of the electronic marshalling system.

5. The simplex I/O component of claim 4, wherein the simplex I/O component is a simplex I/O card.

6. The simplex I/O component of claim 3, wherein the simplex I/O component is a simplex electronic marshalling component, and the I/O subsystem is included in an I/O card or a head-end unit of the electronic marshalling system.

7. The simplex I/O component of claim 1, wherein the user interface of the simplex I/O component includes one or more touch sensors, and the instruction to enter into the replaceable state includes an activation of the one or more touch sensors.

8. The simplex I/O component of claim 1, wherein the simplex I/O component is in an in-service state when the simplex I/O component receives the instruction to enter into the replaceable state.

9. The simplex I/O component of claim 1, wherein the simplex I/O component is in a reduced availability state when the simplex I/O component receives the instruction to enter into the replaceable state.

10. The simplex I/O component of claim 1,
    further comprising a plurality of subcomponents, each of which is respectively configured to deliver, within the simplex I/O component, the data generated by the field device from the first communication interface to the second communication interface; and
    wherein the reception, via the user interface, of the instruction to enter into the replaceable state is based on a failure of one of the subcomponents.

11. The simplex I/O component of claim 10, wherein:
    the simplex I/O component further comprises a visual indicator;
    the simplex I/O component is further configured to, upon detecting the failure of the one of the subcomponents of the simplex I/O component:
       send, to the I/O subsystem via the second communication interface, an indication of the detected subcomponent failure;
       enter into a reduced availability state; and
       activate the visual indicator; and
    the reception of the instruction to enter into the replaceable state is responsive to the activation of the visual indicator.

12. A method performed by a process control system operating to control an industrial process in a process plant, the method including:
    responsive to receiving, by an Input/Output (I/O) I/O subsystem of the process control system, an indication of a simplex I/O component being in a replaceable state, the replaceable state indicative of an imminent physical removal and replacement of the simplex I/O component, storing, by the I/O subsystem, a respective indication that the simplex I/O component is in the replaceable state, the simplex I/O component communicatively coupling the I/O subsystem and a field device, and the I/O subsystem communicatively coupling the simplex I/O component and a controller that receives data generated by the field device, generates a control signal based on the received data, and sends the control signal to the field device, another field device, or another controller to control the operation of the industrial process;

based on the stored indication of the replaceable state of the simplex I/O component, further storing, by the I/O subsystem, a most recently received data value that was generated by the field device and received by the I/O subsystem from the simplex I/O component;

subsequent to storing the most recently received data value generated by the field device, detecting, by the I/O subsystem, a failure to receive an expected signal from the simplex I/O component; and based on the detection of the failure to receive the expected signal and the stored indication of the replaceable state of the simplex I/O component, retrieving the stored, most recently received data value generated by the field device and providing the retrieved data value to the controller, to thereby continue the control of the operation of the industrial process.

13. The method of claim 12, wherein providing the retrieved data value to the controller includes providing the retrieved data value to the controller at a scheduled time.

14. The method of claim 12, wherein receiving the indication of the simplex I/O component being in the replaceable state includes receiving the indication of the simplex I/O component being in the replaceable state from the simplex I/O component.

15. The method of claim 12, further comprising:

activating a timer upon storing the respective indication that the simplex I/O component is in the replaceable state; and deactivating the timer and clearing the stored respective indication that the simplex I/O component is in the replaceable state at least one of: when the activated timer expires prior to a time at which the I/O subsystem expects to receive the expected signal, or when the I/O subsystem receives another transmission from the simplex I/O component prior to the expiration of the activated timer.

16. The method of claim 12, further comprising:

receiving, by the I/O subsystem from the simplex I/O component, an indication that the simplex I/O component has entered into a reduced availability state; and responsive to receiving the indication of the detected fault, storing an indication that the simplex I/O component is in a reduced availability state; and wherein the I/O subsystem receives the indication of the simplex I/O component being in the replaceable state while the simplex I/O component is in the reduced availability state.

17. The method of claim 12, further comprising, subsequent to storing the data value generated by the field device for sending to the controller:

receiving, by the I/O subsystem, an indication that the simplex I/O component is in an in-service state;

based on the received indication that the simplex I/O component is in the in-service state, clearing the stored respective indication that the simplex I/O component is in the replaceable state and clearing any stored, most recently received data values generated by the field device.

18. The method of claim 12, wherein the simplex I/O component is a simplex electronic marshalling component, a simplex I/O signal conditioner, a simplex single channel I/O card, or a simplex multichannel I/O card.

19. The method of claim 12, wherein the simplex I/O component is included in an electronic marshalling system of the process control system.

20. The method of claim 19, wherein the I/O subsystem is included in a head-end unit of the electronic marshalling system.

21. The method of claim 20, wherein the simplex I/O component is a simplex I/O card.

22. The method of claim 19, wherein the simplex I/O component is a simplex electronic marshalling component, and the I/O subsystem is included in an I/O card or a head-end unit of the electronic marshalling system.

* * * * *